(12) United States Patent
Thota

(10) Patent No.: US 11,362,924 B2
(45) Date of Patent: *Jun. 14, 2022

(54) METHODS AND APPARATUS TO MONITOR MEDIA IN A DIRECT MEDIA NETWORK

(71) Applicant: The Nielsen Company (US), LLC, New York, NY (US)

(72) Inventor: Sudheer Thota, Oldsmar, FL (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/780,879

(22) Filed: Feb. 3, 2020

(65) Prior Publication Data

US 2020/0177487 A1 Jun. 4, 2020

Related U.S. Application Data

(63) Continuation of application No. 15/385,548, filed on Dec. 20, 2016, now Pat. No. 10,554,530.

(51) Int. Cl.
*H04L 43/12* (2022.01)
*H04L 67/1042* (2022.01)
(Continued)

(52) U.S. Cl.
CPC .......... *H04L 43/12* (2013.01); *H04L 65/4069* (2013.01); *H04L 67/1044* (2013.01);
(Continued)

(58) Field of Classification Search
CPC . H04L 43/0894; H04L 43/12; H04L 65/4076; H04L 67/1044; H04L 67/105;
(Continued)

(56) References Cited

U.S. PATENT DOCUMENTS 8,225,342 B2 7/2012 Mears et al.
8,473,975 B1* 6/2013 Besehanic .......... H04N 21/6175
725/10
(Continued)

OTHER PUBLICATIONS

Militano et al., "Wi-Fi cooperation or D2D-based multicast content distribution in LTE-A: A comparative analysis", Jun. 2014, IEEE Publishing, IEEE International Conference on Communication Workshops (ICC).*

(Continued)

*Primary Examiner* — Todd L Barker
(74) *Attorney, Agent, or Firm* — Hanley, Flight & Zimmerman, LLC

(57) ABSTRACT

Methods, apparatus, and articles of manufacture to monitor media are disclosed. An example apparatus includes a message extractor to extract message information from a message obtained from a streaming monitor at a media exposure measurement location, the message information including media identification information of media presented in a direct media network and media device information associated with at least one of a streaming client device associated with the direct media network or a media presentation device associated with the direct media network, a media device identifier to identify at least one of the streaming client device or the media presentation device based on the media device information, a media identifier to identify the media based on the media identification information, and a media creditor to credit the media as having been accessed in response to identifying the media.

29 Claims, 9 Drawing Sheets

(51) Int. Cl.
| | |
|---|---|
| *H04N 21/436* | (2011.01) |
| *H04N 21/24* | (2011.01) |
| *H04N 21/442* | (2011.01) |
| *H04W 76/23* | (2018.01) |
| *H04W 76/15* | (2018.01) |
| *H04N 21/8355* | (2011.01) |
| *H04L 67/148* | (2022.01) |
| *H04L 65/61* | (2022.01) |
| *H04W 76/40* | (2018.01) |
| *H04L 43/0894* | (2022.01) |
| *H04L 65/611* | (2022.01) |
| *H04W 84/20* | (2009.01) |
| *H04W 84/12* | (2009.01) |
| *H04L 67/104* | (2022.01) |

(52) U.S. Cl.
CPC ........ *H04L 67/1051* (2013.01); *H04L 67/148* (2013.01); *H04N 21/2407* (2013.01); *H04N 21/436* (2013.01); *H04N 21/44204* (2013.01); *H04N 21/44227* (2013.01); *H04N 21/8355* (2013.01); *H04W 76/15* (2018.02); *H04W 76/23* (2018.02); *H04W 76/40* (2018.02); H04L 43/0894 (2013.01); H04L 65/4076 (2013.01); *H04W 84/12* (2013.01); *H04W 84/20* (2013.01)

(58) Field of Classification Search
CPC .............. H04L 67/148; H04L 65/4069; H04N 21/2407; H04N 21/436; H04N 21/44227; H04N 21/8355; H04N 21/44204; H04W 76/15; H04W 76/23; H04W 84/20; H04W 76/40
See application file for complete search history.

(56) References Cited

U.S. PATENT DOCUMENTS

| | | | |
|---|---|---|---|
| 8,806,002 B2 | 8/2014 | Kakadia et al. | |
| 9,064,011 B2* | 6/2015 | Maharajh | G06F 16/48 |
| 9,077,729 B2 | 7/2015 | Aggarwal et al. | |
| 9,332,035 B2 | 5/2016 | Ramaswamy et al. | |
| 9,585,144 B1* | 2/2017 | Shaw | H04W 76/15 |
| 10,057,651 B1* | 8/2018 | Singh | H04N 21/4623 |
| 2005/0091268 A1* | 4/2005 | Meyer | G06T 1/0021 |
| 2006/0004600 A1* | 1/2006 | Summer | G06Q 99/00 |
| | | | 705/1.1 |
| 2007/0136384 A1* | 6/2007 | Hepper | G06F 3/067 |
| 2008/0270598 A1* | 10/2008 | Chen | H04N 21/25816 |
| | | | 709/224 |
| 2010/0195602 A1* | 8/2010 | Kovvali | H04W 28/0205 |
| | | | 370/329 |
| 2010/0208590 A1* | 8/2010 | Dolganow | H04W 4/02 |
| | | | 370/235 |
| 2011/0153391 A1 | 6/2011 | Tenbrock | |
| 2011/0252151 A1* | 10/2011 | Lu | H04L 67/1093 |
| | | | 709/228 |
| 2013/0034023 A1 | 2/2013 | Jung | |
| 2013/0040576 A1 | 2/2013 | Yoon | |
| 2013/0160042 A1 | 6/2013 | Stokes et al. | |
| 2013/0170657 A1* | 7/2013 | Conklin | H04N 21/4394 |
| | | | 381/58 |
| 2014/0032951 A1 | 1/2014 | Garg et al. | |
| 2014/0244828 A1* | 8/2014 | Besehanic | H04L 65/602 |
| | | | 709/224 |
| 2014/0244834 A1* | 8/2014 | Guedalia | H04W 4/21 |
| | | | 709/224 |
| 2014/0344848 A1 | 11/2014 | Busse et al. | |
| 2015/0032883 A1* | 1/2015 | Chandrashekar | H04L 65/4069 |
| | | | 709/224 |
| 2015/0117340 A1* | 4/2015 | Kawakami | G06F 21/74 |
| | | | 370/329 |
| 2015/0181269 A1* | 6/2015 | McMillan | H04H 60/44 |
| | | | 725/19 |
| 2016/0021586 A1 | 1/2016 | Akhi et al. | |
| 2016/0105859 A1* | 4/2016 | Zhu | H04W 76/11 |
| | | | 370/350 |
| 2017/0111244 A1* | 4/2017 | Strater | H04W 28/0284 |
| 2017/0134182 A1 | 5/2017 | Davis et al. | |
| 2017/0195374 A1 | 7/2017 | Vu et al. | |

OTHER PUBLICATIONS

WiFi Alliance, "Wi-Fi Peer-to-Peer (P2P) Technical Specification", Version 1.7, Jul. 2016.*

Warren et al., "Metadata Indepencent Hashing for Media Identification & P2P Transfer Optimization", 2012 International Conference on Cyber-Enabled Disributed Computing and Knowledge Discover, Oct. 2012.*

Koz et al., "Content Based Video Identification in Peer-to-Peer Networks: Requirements and a Novel Solution," Delft University of Technology, IEEE Transactions on Image Processing, 2012, 12 pages.

Wi-Fi Alliance, "WiFi Peer-to-Peer (P2P) Technical Specification," Version 1.7, Jul. 6, 2016, 201 pages.

United States Patent and Trademark Office, "Advisory Action," Issued in connection with U.S. Appl. No. 15/385,548, dated May 1, 2019, 3 pages.

United States Patent and Trademark Office, "Non-Final Office Action," Issued in connection with U.S. Appl. No. 15/385,548, dated Jul. 27, 2018, 33 pages.

United States Patent and Trademark Office, "Final Rejection," Issued in connection with U.S. Appl. No. 15/385,548, dated Feb. 25, 2019, 40 pages.

United States Patent and Trademark Office, "Notice of Allowance," Issued in connection with U.S. Appl. No. 15/385,548, dated Sep. 30, 2019, 14 pages.

* cited by examiner

METHODS AND APPARATUS TO MONITOR MEDIA IN A DIRECT MEDIA NETWORK

RELATED APPLICATION

This patent arises from a continuation of U.S. patent application Ser. No. 15/385,548, (now U.S. Pat. No. 10,554, 530) which was filed on Dec. 20, 2016. U.S. patent application Ser. No. 15/385,548 is hereby incorporated herein by reference in its entirety. Priority to U.S. patent application Ser. No. 15/385,548 is hereby claimed.

FIELD OF THE DISCLOSURE

This disclosure relates generally to monitoring media, and, more particularly, to methods and apparatus to monitor media in a direct media network.

BACKGROUND

In recent years, methods of accessing media have evolved. For example, in the past, Internet media was primarily accessed via computer systems such as desktop and laptop computers. Recently, handheld mobile devices (e.g., smartphones, tablets, etc.) have been introduced that allow users to request and view Internet media. Such handheld mobile devices have been equipped with a capability to stream the Internet media on additional streaming media devices (e.g., smartphones, tablets, televisions, etc.).

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
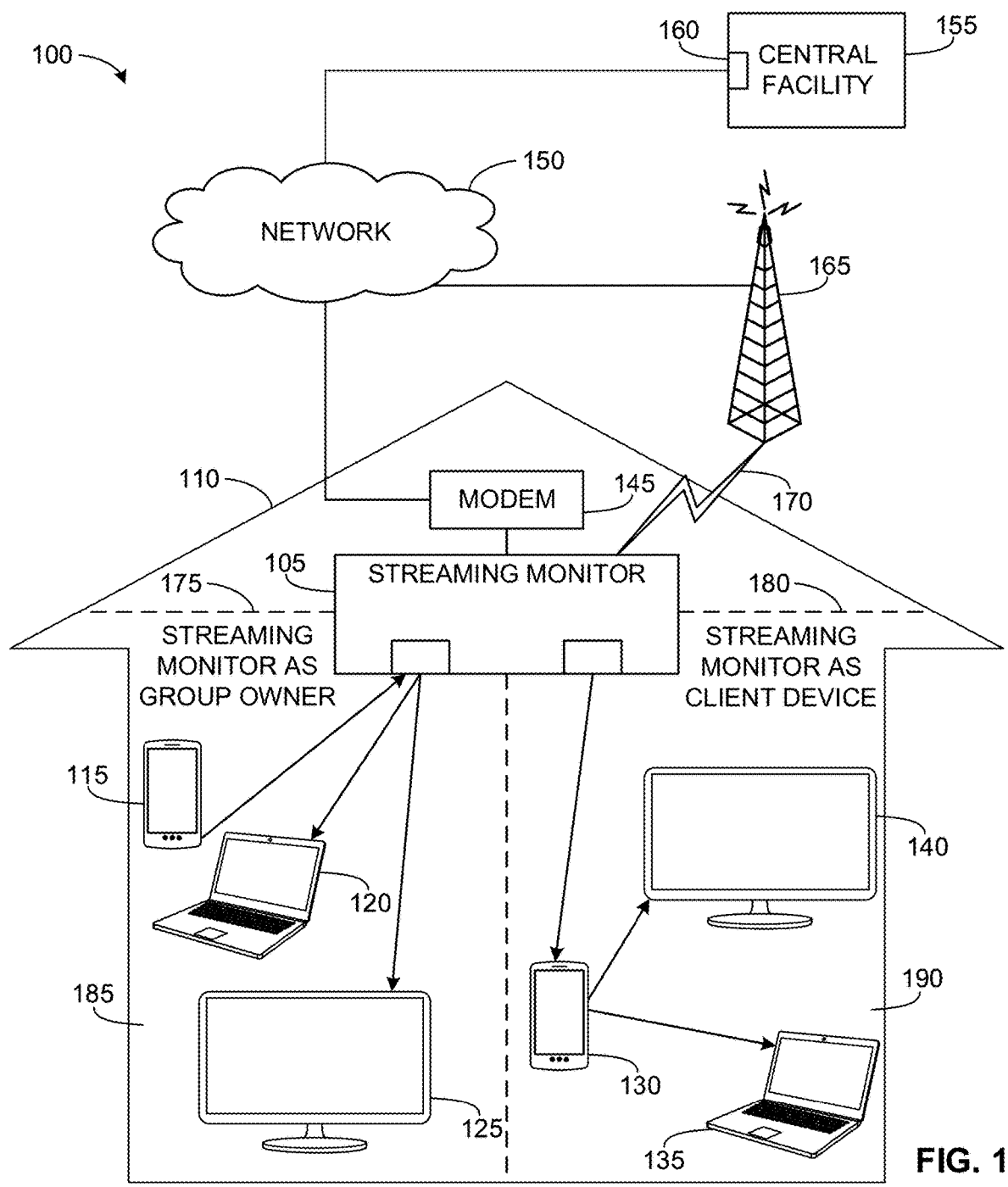
FIG. 1 is a block diagram of an example environment in which an example streaming monitor monitors streaming media.

In recent years, the use of media devices (e.g., an Apple TV®, an Apple iPad®, a Google Chromecast™, a Roku™ media player, a Slingbox™ media player, a Microsoft® Xbox®, a Sony PlayStation™, etc.) to present streaming media available via the Internet has increased. As used herein "media" refers to audio and/or visual (still or moving) content and/or advertisements. As used herein, streaming and/or streaming media refers to media that is presented to a user by a media device at least partially in parallel with the media being transmitted (e.g., via a network) to the media device (or a device associated with the media device) from a media provider.

As different types of media providers and media applications (e.g., a Netflix™ application, a Hulu™ application, a Pandora™ application, etc.) for such media devices have been created, the popularity of streaming media has increased. Indeed, some households have eliminated traditional sources of media (e.g., satellite television, cable television) in favor of such streaming devices. In view of the increasing popularity of accessing media in this manner, understanding how users interact with the streaming media (e.g., such as by understanding what media is presented, how the media is presented, who is accessing such media, etc.) provides valuable information to service providers, advertisers, content providers, media providers, manufacturers, and/or other entities.

In some examples, users view streaming media via a streaming device such as, for example, a smartphone, a tablet, a personal computer, etc. Streaming media is transmitted from a media provider (e.g., a streaming media provider such as, for example, Netflix™, Hulu™, etc.) to the streaming device via a network. In some examples, the media is displayed by the streaming device that receives the streaming media. However, in some examples, the streaming device uses remote presentation techniques to present the media via a media presentation device such as, for example, a television.

In some examples, the remote presentation is implemented by transmitting the media to the media presentation device (e.g., the television) via, for example, a peer-to-peer (P2P) network. Wi-Fi Direct is an example P2P network used to share the media and/or stream the media from a streaming client device (e.g., a smartphone, a tablet, a personal computer, etc.) to a media presentation device (e.g., a television) without the use of a wireless access point. Wi-Fi Direct is an example wireless technology standard enabling devices to connect to one another without the use of the wireless access point and a corresponding Internet connection. Users may utilize a Wi-Fi Direct connection to display media, share information, and/or sync data without joining a traditional home, office, or hotspot network. Such devices that may utilize the Wi-Fi Direct technology include cameras, gaming devices, mobile phones, printers, personal computers, etc. Devices may use the Wi-Fi Direct connection to make a one-to-one connection, or form a group where multiple devices are connected to each other simultaneously.

Streaming media applications that include the use of one or more Wi-Fi Direct connections may pose challenges to a monitoring system that includes using an installed metering device in a household. In some examples, a user with a streaming client device (e.g., a smartphone, a tablet, a personal computer, etc.) may stream media directly to a media presentation device (e.g., a television) and bypass an installed metering device in the household. For example, the user in the household may stream the media directly from the streaming client device to the media presentation device via a Wi-Fi Direct connection. Streaming the media directly to the media presentation device may include the media not passing through an intermediary device (e.g., a meter, a modem, a router, etc.) or being subject to metering processing such as, for example, extracting embedded codes, signatures, watermarks, etc. from the media. Bypassing the installed metering device may include the metering device not being able to monitor the media between the streaming client device and the media presentation device. For example, the streaming client device and the media presentation device may be in a Wi-Fi Direct network. The metering device may not be connected to the same Wi-Fi Direct network and, thus, may not be able to monitor information such as media identification (e.g., identification of media) information, media device information, etc. If the streaming client device streams the media directly to the media presentation device in the Wi-Fi Direct network, the media avoids being transmitted through the installed meter and/or processed by the installed meter. Bypassing the installed meter prevents the meter from performing functions such as, for example, extracting media identification information from the media and identifying the media based on the extracted media identification information.

Example methods, apparatus, systems, and articles of manufacture disclosed herein may be used to identify media information within the Wi-Fi Direct network. In some examples, the media information relates to media streaming from a streaming client device to a media presentation device. In some instances, the media information relates to the media transmitted from the streaming client device to the media presentation device in a non-streaming application. For example, the media information may relate to the media presented by the media presentation device, where the media was completely transmitted to the media presentation device prior to the media presentation device accessing the media. For example, the media presentation device may present the media during a time period in which the streaming client device is not transmitting the media to the media presentation device.

The media information may include media identification information of the media. For example, the media identification information may include information identifying a type of the media (e.g., the media is an audio file, the media is a video file, etc.), identifying a source of the media (e.g., an audio file from Spotify®, a video file from YouTube®, etc.). The media information may include quality information of the media. For example, the quality information may include a resolution of the media (e.g., an audio file resolution, a video file resolution, etc.). The media information may include network performance information related to a transmission of the media. For example, the media information may include a bandwidth (e.g., a data rate) of a data connection between two devices where a first device is streaming the media to a second device. The media information may also include tag information such as, for example, geotag information associated with accessing the media.

While the examples included herein refer to Wi-Fi Direct networks by example, any type of direct media network (e.g., a network including a point-to-point connection between two devices enabling a transfer of media between the two devices, where the transfer is not transmitted through a third device) may be utilized. Any instance of Wi-Fi Direct described herein may be interpreted as direct media network.

Example methods, apparatus, systems, and articles of manufacture disclosed herein may be used to identify media device information of a media device (e.g., a media device operating as a Group Owner, a media device operating as a client device, etc.) within the Wi-Fi Direct network. The media device information may include device identification information (e.g., a device name, a device ID, etc.), device manufacturer information (e.g., Apple®, Google®, Samsung®, etc.), device type information (e.g., Apple® iPhone® 7, Google® Pixel, etc.), device operating system information (e.g., Apple® iOS, Google® Android®, etc.), and/or a device media access control (MAC) address.

In some disclosed examples, a streaming monitor is a Group Owner of a Wi-Fi Direct network. As used herein, the phrase "Group Owner" refers to a device that forms and monitors a group (e.g., a Wi-Fi Direct network), where the device operates as an access point in the group where additional devices may join the group as client devices. The Group Owner may have responsibilities such as, for example, starting and stopping the Wi-Fi Direct network, configuring an operation mode of one or more devices to function as a Group Client, monitoring the media information, the media device information, etc. In some examples, the Group Owner may relay and/or transmit media from a streaming client device to a media presentation device. The Group Owner may obtain the media information such as, for example, quality information of the media (e.g., the media is 720p video, the media is 1080p video, etc.), a source identification of the media (e.g., the media is video content from Vimeo®, the media is video content from YouTube®, etc.) a type identification of the media (e.g., the media is an audio file, the media is a photo file, the media is a video file, etc.), a bandwidth of the streaming media (e.g., a bandwidth of data transfer), etc. The Group Owner may obtain the media device information of the streaming client device such as, for example, the device type information (e.g., the device type is an Apple® iPhone® 7) of the streaming client device, the MAC address of the streaming client device, etc.

In some disclosed examples in which the streaming monitor is configured to operate as the Group Owner of the Wi-Fi Direct network, the streaming monitor periodically sends information to a central facility for processing. The streaming monitor may obtain information from one or more client devices connected to the Wi-Fi Direct network. The streaming monitor may process the obtained information and generate one or more messages or messages. A message may be, for example, a data packet or a collection of data packets that include the media information and/or the media device information. For example, the message may include the media information regarding data flow within the Wi-Fi Direct network. In another example, the message may include a bandwidth of streaming media, a source identification of the streaming media (e.g., a YouTube® uniform resource locator, etc.), quality information of the streaming media (e.g., the streaming media is a 1080p video, etc.) or tag information of the streaming media (e.g., a geotag, etc.).

In some disclosed examples, the message includes the media device information regarding the media devices in the Wi-Fi Direct network. For example, the message may include the device identification information (e.g., the device name, the device ID, etc.), the device manufacturer information (e.g., Apple®, Google®, Samsung®, etc.), the device type information (e.g., Apple® iPhone® 7, Google® Pixel, etc.), the device operating system information (e.g., Apple® iOS, Google® Android®, etc.), and/or the device MAC address. In some instances, the message includes administrative information such as, for example, a time stamp, a number of devices connected to the network, etc. In some instances, the message(s) are transmitted to the central facility over a cellular or wireless network (e.g., a wireless connection).

In some disclosed examples, the streaming monitor is configured to operate as a client device of an existing Wi-Fi Direct network (e.g., instead of or in addition to operating as a Group Owner). For example, the streaming monitor may be a client device of the Wi-Fi direct network, where a user's mobile device is a Group Owner of the Wi-Fi direct network. The streaming monitor configured as the client device may have responsibilities such as, for example, connecting and disconnecting to the Wi-Fi Direct network via the Group Owner. The streaming monitor may also broadcast the media device information regarding the devices connected to the Wi-Fi Direct network such as, for example, the device identification information (e.g., the device name, the device ID, etc.), the device manufacturer information (e.g., Apple®, Google®, Samsung®, etc.), the device type information (e.g., Apple® iPhone®, Google® Pixel™, etc.), the device operating system information (e.g., Apple® iOS, Google® Android™, etc.), and/or the device MAC address. The streaming monitor may obtain the media information from the Group Owner such as a bandwidth (e.g., a bandwidth of data transfer) of the streaming media.

In some disclosed examples, the streaming monitor configured as the client device of the Wi-Fi Direct network periodically sends information to the central facility for processing. The streaming monitor may obtain the information from the Group Owner and/or the client devices connected to the Wi-Fi Direct network. The streaming monitor may process the obtained information and generate one or more messages. A message may be, for example, a data packet or a collection of data packets that include information regarding the Wi-Fi Direct network and/or information regarding one or more client devices connected to the network. The message may include the media device information regarding the media devices in the Wi-Fi Direct network. For example, the message may include the device identification information (e.g., the device name, the device ID, etc.), the device manufacturer information (e.g., Apple®, Google®, Samsung®, etc.), the device type information (e.g., Apple® iPhone® 7, Google® Pixel, etc.), the device operating system information (e.g., Apple® iOS, Google® Android®, etc.), and/or the device MAC address. In some examples, the message also includes administrative information such as, for example, a time stamp, a number of devices connected to the network, etc. In some instances, the message(s) are transmitted to the central facility over a cellular or wireless network.

FIG. 1 is a block diagram of an example environment 100 constructed in accordance with the teachings of this disclosure to identify media (e.g., streaming media) and/or media device information within a Wi-Fi Direct network. The example environment 100 includes an example streaming monitor 105 operating in an example media exposure measurement location 110. The example media exposure measurement location 110 includes example media devices 115, 120, 125, 130, 135, 140 and an example modem 145. Further shown are an example network 150, an example central facility 155, an example network interface 160, an example wireless communication system 165, an example wireless communication link 170, an environment 175, an environment 180, an example Wi-Fi Direct network 185, and an example Wi-Fi Direct network 190.

In the illustrated example of FIG. 1, the streaming monitor 105 is configured to operate in an environment 175 where it operates as the Group Owner. In the illustrated example, the streaming monitor 105 is also configured to operate in an environment 180 where it operates as a client device. In the illustrated example, the streaming monitor 105 includes at least two Wi-Fi radios, where a first Wi-Fi radio is dedicated to streaming monitor Group Owner functions and a second Wi-Fi radio is dedicated to streaming monitor client device functions.

The media exposure measurement location 110 of the illustrated example of FIG. 1 is a panelist household. However, the example media exposure measurement location 110 may be any other location, such as, for example an Internet café, an office, an airport, a library, a non-panelist household, etc. While, in the illustrated example, a single media exposure measurement location 110 is shown, any number and/or type(s) of media exposure measurement locations may be used.

The panelist household may include one or more panelists. The panelists are users registered on panels maintained by a ratings entity (e.g., an audience measurement company) that owns and/or operates the ratings entity subsystem. Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People (e.g., households, organizations, etc.) register as panelists via, for example, a user interface presented on a media device (e.g., via a website). People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.).

In the illustrated example, the media exposure measurement location 110 includes the media devices 115, 120, 125, 130, 135, 140. The example media devices 115, 120, 125, 135, 140 are client devices of the example Wi-Fi Direct networks 185, 190. In some examples, the client devices also function as streaming client devices, where the streaming client devices stream media to media presentation devices. For example, the media device 115 is a streaming client device that streams the media to the media device 125. In some examples, the client devices also function as media presentation devices, where the media presentation devices present the media streamed from the streaming client devices. For example, the media device 125 is a media presentation device that presents the media streamed from the media device 115.

In the illustrated example of FIG. 1, there are two Wi-Fi Direct networks 185, 190 at the media exposure measurement location 110. However, there may be additional Wi-Fi Direct networks at the example media exposure measurement location 110. In the example Wi-Fi Direct network 185, the example streaming monitor 105 is configured to operate as the Group Owner. The example streaming monitor 105 is responsible for forming, monitoring, and disabling the example Wi-Fi Direct network 185. Additionally or alternatively, there may be multiple streaming monitors to monitor one or more Wi-Fi Direct networks. For example, the streaming monitor 105 and a second streaming monitor may monitor the Wi-Fi Direct network 185. In another example, the streaming monitor 105 and a third streaming monitor may monitor the Wi-Fi Direct networks 185, 190.

During the formation process of the example Wi-Fi Direct network 185, the example streaming monitor 105 engages in a negotiation process with a first client device. For example, the streaming monitor 105 may engage in the negotiation process with the media device 115. The negotiation process may include a comparison of a value for a Group Owner intent attribute. For example, the Group Owner of the Wi-Fi Direct network 185 may be decided based on a comparison of a value of a Group Owner intent attribute for the media device 115 to a value of a Group Owner intent attribute for the streaming monitor 105. The determination of the Group Owner of the Wi-Fi Direct network 185 may be decided based on having a greater value for a value of a Group Owner intent attribute. Upon successful completion of the negotiation process, the example streaming monitor 105 is determined to be the Group Owner and the example media device 115 is determined to be a client device of the example Wi-Fi Direct network 185. For example, the streaming monitor 105 may have a value of 10 for a Group Owner intent attribute in comparison to the media device 115 having a value of 5 for a Group Owner intent attribute, where the greater value for the Group Owner intent attribute determines whether a device is the Group Owner of the Wi-Fi Direct network 185.

In the illustrated example, the streaming monitor 105 is responsible for monitoring the Wi-Fi Direct network 185. The example streaming monitor 105 may occasionally send one or more data packets to connected client devices to monitor the example Wi-Fi Direct network 185. For example, the streaming monitor 105 may send a heartbeat data packet every 100 milliseconds to the media devices 115, 120, 125. The example media devices 115, 120, 125 may receive the heartbeat data packet and send a confirmation data packet confirming their continued connection to the example Wi-Fi Direct network 185. In some instances, the streaming monitor 105 may receive a cancellation data packet(s) from the media devices 115, 120, 125 alerting the streaming monitor 105 that one or more of the media devices 115, 120, 125 have left the Wi-Fi Direct network 185.

In some examples, the streaming monitor 105 sends beacons within the media exposure measurement location 110 to determine if additional media devices are available to connect to the Wi-Fi Direct network 185. For example, if the media device 120 belongs to a guest user visiting the media exposure measurement location 110, the media device 120 may receive a beacon from the streaming monitor 105. The beacon may alert the example media device 120 that the example Wi-Fi Direct network 185 is available to join. In response to receiving the beacon, the guest user may request the example streaming monitor 105 to join the example Wi-Fi Direct network 185 via the example media device 120.

In the illustrated example of FIG. 1, the streaming monitor 105 monitors the Wi-Fi Direct network 185 by obtaining the media information. In some examples, the streaming monitor 105 obtains the media information regarding the media streamed to the streaming monitor 105. For example, the streaming monitor 105 may obtain the media identification information by inspecting media metadata, a uniform resource locator (URL) associated with the media, etc. In some examples, the streaming monitor 105 may obtain the media quality information related to the media streaming from the media device 115 to the streaming monitor 105. The media quality information may include a resolution of the media (e.g., an audio file resolution, a video file resolution, etc.), etc. For example, the streaming monitor 105 may determine that the media is a 1080p video file. In some instances, the streaming monitor 105 may obtain the network performance information. For example, the network performance information may include the bandwidth of the data being transmitted to the streaming monitor 105 from the media device 115. The example streaming monitor 105 may also obtain tag information related to the media such as, for example, the geotag of the media.

In the illustrated example, the streaming monitor 105 monitors the Wi-Fi Direct network 185 by obtaining the media device information regarding the media devices 115, 120, 125. The media device information may include the device identification information (e.g., the device name, the device ID, etc.), the device manufacturer information (e.g., Apple®, Google®, Samsung®, etc.), the device type information (e.g., Apple® iPhone® 7, Google® Pixel, etc.), the device operating system information (e.g., Apple® iOS, Google® Android®, etc.), and/or the device MAC address. For example, the streaming monitor 105 may obtain device identification information from the media device 115 that the media device 115 is an Apple® iPhone® 7 running iOS 10.

In the illustrated example, the streaming monitor 105 is responsible for disabling the Wi-Fi Direct network 185. The example streaming monitor 105 disables the example Wi-Fi Direct network 185 by discontinuing connections between the streaming monitor 105 and the example media devices 115, 120, 125. In some examples, the streaming monitor 105 may disable the network by leaving the network. For example, the streaming monitor 105 may leave the Wi-Fi Direct network 185. Without a Group Owner to administer and monitor the network, the example Wi-Fi Direct network 185 effectively becomes disabled. In addition, since the example media devices 115, 120, 125 are connected to the example streaming monitor 105 individually without a connection to each other, the removal of the streaming monitor 105 ends the peripheral connection the media devices 115, 120, 125 had with each other via the streaming monitor 105.

In the illustrated example of FIG. 1, the media device 115 is a client device of the Wi-Fi Direct network 185. The example media device 115 is also a streaming client device (e.g., a smartphone), which streams media to the example streaming monitor 105. In the illustrated example, the media device 115 streams the media to the media device 125 via the streaming monitor 105. The example streaming monitor 105 receives the media from the example media device 115 and relays the media to the example media device 125. The example streaming monitor 105 may process the media streamed from the example media device 115 to obtain the media information prior to transmitting the media to the example media device 125. In some examples, the streaming monitor 105 may store a component of the media locally on the streaming monitor 105 for future processing.

In some examples, the media device 115 transmits the media to the media device 125 via the streaming monitor 105 in response to executing a set of machine-readable instructions. In some instances, the set of machine-readable instructions executed by the media device 115 to stream the media to the streaming monitor 105 instead of directly to the media device 125 are obtained from the streaming monitor 105. For example, the media device 115 may obtain the machine-readable instructions from the streaming monitor 105 when the media device 115 connects to the Wi-Fi Direct network 185. In another example, the media device 115 may obtain the machine-readable instructions from the streaming monitor 105 when the media device 115 performs the negotiation process with the streaming monitor 105.

In the illustrated example of FIG. 1, the media device 120 is a client device (e.g., a laptop, a personal computer, etc.)

of the Wi-Fi Direct network 185. The example media device 120 transmits media device information such as, for example, the device identification information, the device manufacturer information, the device type information, the device operating system, the device MAC address, etc. to the example streaming monitor 105. For example, the media device 120 may transmit to the streaming monitor 105 that the media device 120 is an Apple® MacBook® running macOS™ Sierra.

In some examples, the media device 120 may also be a streaming client device. For example, the media device 120 may stream a first media to the media device 125 via the streaming monitor 105 while the media device 115 streams a second media to the media device 125 via the streaming monitor 105. The example streaming monitor 105 may determine to stream the first media, the second media, and/or a combination thereof to the example media device 125. In some instances, the media device 120 streams the second media to the streaming monitor 105 in place of the media device 115 streaming the first media to the streaming monitor 105.

In the illustrated example of FIG. 1, the media device 125 is a client device of the Wi-Fi Direct network 185. The example media device 125 is also a media presentation device (e.g., a television) that may present the media streamed from the example media devices 115, 120. The example media device 125 may be responsible for transmitting media device information such as, for example, the device identification information, the device manufacturer information, the device type information, the device operating system, the device MAC address, etc. to the example streaming monitor 105. For example, the media device 120 may transmit to the streaming monitor 105 that the media device 120 is a Samsung® smart television. In the illustrated example, the media device 125 presents the media streamed from the media device 115 via the streaming monitor 105. In some examples, the media device 125 presents the media streamed from the media device 120 via the streaming monitor 105.

In the illustrated example of FIG. 1, the media device 130 is a Group Owner of the example Wi-Fi Direct network 190. The example media device 130 is responsible for forming, monitoring, and disabling the example Wi-Fi Direct network 190. The example media device 130 streams media to the example media device 140. In some examples, the media device 130 streams the media to the media device 135. The example media device 130 obtains media device information regarding the example streaming monitor 105 operating as the client device, and the example media devices 135, 140. For example, the media device 130 may obtain media device information from the media device 140 that the media device 140 is a Samsung® smart television. The example media device 130 may also obtain media information. For example, the media device 130 may obtain a bandwidth of the connection between the media device 130 and the media device 140.

In the Wi-Fi Direct network 190 of FIG. 1, the streaming monitor 105 is configured to operate as a client device. The example streaming monitor 105 operating as the client device is responsible for transmitting media device information such as, for example, the device identification information, the device manufacturer information, the device type information, the device operating system, the device MAC address, etc. to the example media device 130. In some examples, the streaming monitor 105 operating as the client device is configured to obtain the media device information regarding a plurality of devices in the Wi-Fi Direct network 190. For example, the streaming monitor 105 may obtain the media device information of the media devices 130, 135, 140 from the media device 130. In some instances, the streaming monitor 105 operating as the client device is configured to obtain the media information from the Group Owner of the Wi-Fi Direct network 190. For example, the streaming monitor 105 may obtain the bandwidth of the connection between the media device 130 and the media device 140 from the media device 130.

In the illustrated example of FIG. 1, the media device 135 is a client device (e.g., a laptop, a personal computer, etc.) of the Wi-Fi Direct network 190. The example media device 135 may be responsible for transmitting device identification information such as, for example, the device identification information, the device manufacturer information, the device type information, the device operating system, the device MAC address, etc. to the Group Owner of the example Wi-Fi Direct network 190. For example, the media device 135 may transmit to the media device 130 that the media device 135 is an Apple® MacBook® running macOS™ Sierra. In some examples, the media device 135 streams a first media to the media device 140 instead of the media device 130 streaming a second media to the media device 140.

In the illustrated example of FIG. 1, the media device 140 is a client device of the Wi-Fi Direct network 190. The example media device 140 is also a media presentation device (e.g., a television) that is capable of presenting the media streamed from the example media devices 130, 135. The example media device 140 may be responsible for transmitting media device information such as, for example, the device identification information, the device manufacturer information, the device type information, the device operating system, the device MAC address, etc. to the Group Owner of the example Wi-Fi Direct network 190. For example, the media device 140 may transmit to the media device 130 that the media device 140 is a Samsung® smart television.

In the illustrated example of FIG. 1, the streaming monitor 105 is configured to process the obtained media information and/or the media device information and generate one or more messages. A message may be, for example, a data packet or a collection of data packets that include the obtained media information and/or the obtained media device information. For example, the message may include the media information regarding the data flow within the Wi-Fi Direct network 185 and the Wi-Fi Direct network 190. For example, the message may include a bandwidth of streaming media, a source identification of the streaming media (e.g., a YouTube® uniform resource locator, etc.), the quality information of the streaming media (e.g., the streaming media is a 1080p video, etc.), the tag information of the streaming media (e.g., the geotag, etc.).

In the illustrated example of FIG. 1, the streaming monitor 105 transmits the message(s) generated from the obtained information to the central facility 155 via the network 150. The example streaming monitor 105 may generate the message(s) from the obtained information, where the obtained information is from the example Wi-Fi Direct network 185, the example Wi-Fi Direct network 190, and/or a combination thereof. In some examples, the streaming monitor 105 transmits the message(s) as they are generated. In some instances, the streaming monitor 105 transmits the message(s) after a time period. For example, the streaming monitor 105 may transmit the message(s) every 100 milliseconds, every hour, every day, etc. The example streaming monitor 105 may generate a log of the message(s) and transmit the log to the central facility 155 in lieu of the message(s) themselves.

In some examples, the streaming monitor 105 processes the obtained media information and/or the media device information prior to transmitting the message(s) to the central facility 155. For example, the streaming monitor 105 may associate the obtained media information with the obtained media device information. The example streaming monitor 105 may credit the example media devices 115, 120, 125, 130, 135, 140 as having streamed and/or presented the media. For example, the streaming monitor 105 may credit the media device 115 as having streamed the media. In some examples, the streaming monitor 105 credits media identification information to the media devices 115, 120, 125, 130, 135, 140. For example, the streaming monitor 105 may credit the media device 115 with streaming a YouTube® video. The example streaming monitor 105 may also credit the example media device 125 with presenting the YouTube® video.

In some instances, the streaming monitor 105 performs an analysis on the processed information based on the obtained information. The example streaming monitor 105 may determine media device usage statistics based on the obtained information from the example media devices 115, 120, 125, 130, 135, 140. For example, the streaming monitor 105 may determine that the media device 115 has streamed the most media at the media exposure measurement location 110, that the media device 125 has presented the most media at the media exposure measurement location 110, etc. The example streaming monitor 105 may also determine media device usage statistics based on the media device information. For example, the streaming monitor 105 may determine that Apple® products were used more than Google® products to stream and/or present the media.

The modem 145 of the illustrated example of FIG. 1 is an electronic communications device that enables network communications of the media exposure measurement location 110 to reach the network 150. Alternatively, the example modem 145 may enable point-to-point communications with the example central facility 155. In some examples, the modem 145 is a digital subscriber line (DSL) modem, while in some other examples the modem 145 is a cable modem. In some examples, the modem 145 is a media converter that converts one communications medium (e.g., electrical communications, optical communications, wireless communications, etc.) into another type of communications medium.

In the illustrated example of FIG. 1, the streaming monitor 105 sends obtained and processed media information and/or media device information to the central facility 155 for analysis via the network 150. The network 150 of the illustrated example of FIG. 1 is the Internet. However, the example network 150 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 150 enables the example streaming monitor 105 to be in communication with the example central facility 155. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time messages.

The central facility 155 of the illustrated example is a server that obtains and processes media monitoring information from the streaming monitor 105 to generate exposure metrics related to presented media. The example central facility 155 analyzes the media monitoring information to identify, for example, which media presentation devices are the most owned, the most-frequently used, the least-frequently owned, the least-frequently used, the most/least-frequently used for particular type(s) and/or genre(s) of media, and/or any other media statistics or aggregate information that may be determined from the data. The media presentation device information may also be correlated or processed with factors such as geodemographic data (e.g., a geographic location of the media exposure measurement location, age(s) of the panelist(s) associated with the media exposure measurement location, an income level of a panelist, etc.). Media presentation device information may be useful to manufacturers and/or advertisers to determine which features should be improved, determine which features are popular among users, identify geodemographic trends with respect to media presentation devices, identify market opportunities, and/or otherwise evaluate their own and/or their competitors' products.

In the illustrated example, the central facility 155 includes the network interface 160 to receive Internet messages (e.g., a HyperText Transfer Protocol (HTTP) request(s)) that include the metering information. Additionally or alternatively, any other method(s) to receive metering information may be used such as, for example, an HTTP Secure protocol (HTTPS), a file transfer protocol (FTP), a secure file transfer protocol (SFTP), etc.

In some examples, the streaming monitor 105 is unable to transmit information to the central facility 155 via the modem 145. For example, a server upstream of the modem 145 may not provide functional routing capabilities to the central facility 155. In the illustrated example, the streaming monitor 105 includes additional capabilities to communicate to the central facility 155. As shown in FIG. 1, the streaming monitor 105 includes the capabilities to send information through the wireless communication system 165 (e.g., the cellular communication system) via the wireless communication link 170.

The wireless communication link 170 of the illustrated example is a cellular communication link. However, any other method and/or system of communication may additionally or alternatively be used such as, for example, an Ethernet connection, a Bluetooth connection, a Wi-Fi connection, etc. Further, the wireless communication link 170 of FIG. 1 implements a cellular connection via a Global System for Mobile Communications (GSM). However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

Figure 2:
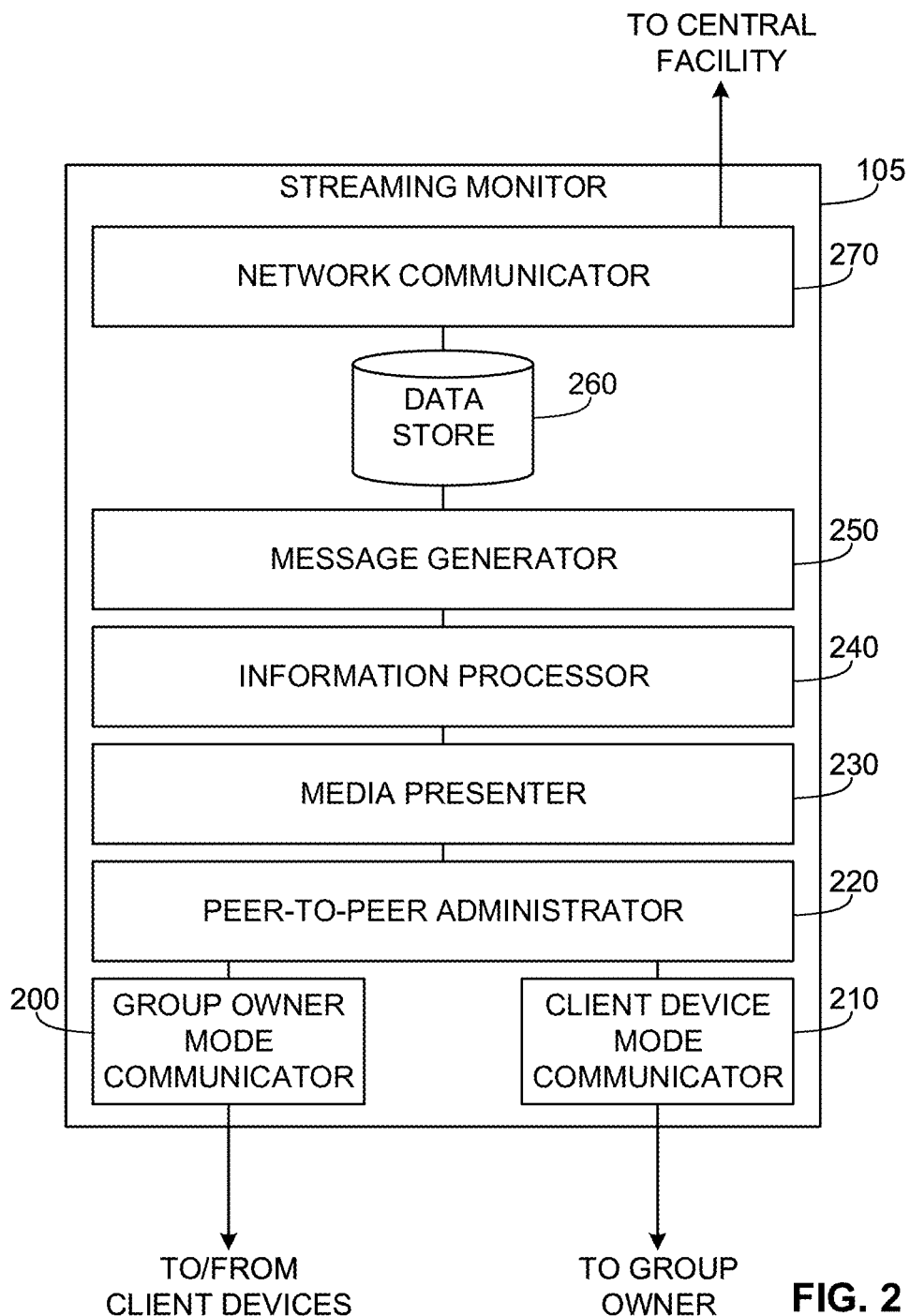
FIG. 2 is a block diagram of an example implementation of the streaming monitor of FIG. 1.

FIG. 2 is a block diagram of an example implementation of the example streaming monitor 105 of FIG. 1. The example streaming monitor 105 of FIG. 2 includes an example Group Owner mode communicator 200, an example client device mode communicator 210, an example peer-to-peer (P2P) administrator 220, an example media presenter 230, an example information processor 240, an example message generator 250, an example data store 260, and an example network communicator 270.

In the illustrated example of FIG. 2, the streaming monitor 105 includes the Group Owner mode communicator 200 to communicate with one or more client devices connected to the streaming monitor 105 in a Wi-Fi Direct network, where the streaming monitor 105 operates as a Group Owner. In the illustrated example, the Group Owner mode communicator 200 obtains and/or transmits information to the one or more client devices of the Wi-Fi Direct network. In some examples, the Group Owner mode communicator 200 obtains media device information. For example, the Group Owner mode communicator 200 may obtain device identification information, device manufacturer information, device type information, device operating system information, a device media access control (MAC) address, etc. of the one or more client devices of the Wi-Fi Direct network.

In some instances, the Group Owner mode communicator 200 obtains media information. For example, the Group Owner mode communicator 200 may obtain information corresponding to media received from one or more client devices. For example, the Group Owner mode communicator 200 may obtain quality information of the media, source identification of the media, a type identification of the media, and a bandwidth of the streaming media.

In some examples, the Group Owner mode communicator 200 transmits information to the one or more client devices connected to the streaming monitor 105 in the Wi-Fi Direct network. In some examples, the Group Owner mode communicator 200 transmits media device information. In some instances, the Group Owner mode communicator 200 transmits media. For example, the Group Owner mode communicator 200 may transmit the media received from a first client device to a second client device. In some examples, the Group Owner mode communicator 200 transmits P2P administrator information (e.g., a Wi-Fi Direct data packet). For example, the Group Owner mode communicator 200 may transmit a Group Owner negotiation packet, a Group Owner negotiation response packet, a Group Owner confirmation packet, etc. In another example, the Group Owner mode communicator 200 may transmit a beacon to the one or more client devices that may not already be connected to the Wi-Fi Direct network.

In the illustrated example of FIG. 2, the streaming monitor 105 includes the client device mode communicator 210 to communicate with a Group Owner of a Wi-Fi Direct network where the streaming monitor 105 operates as a client device. In the illustrated example, the client device mode communicator 210 obtains and/or transmits information to the Group Owner of the Wi-Fi Direct network. In some examples, the client device mode communicator 210 obtains media device information corresponding to the Group Owner and/or the one or more client devices connected to the Group Owner of the Wi-Fi Direct network. For example, the client device mode communicator 210 may obtain device identification information, device manufacturer information, device type information, device operating system information, a device media access control (MAC) address, etc. of the Group Owner and/or the one or more client devices connected to the Group Owner of the Wi-Fi Direct network. In some instances, the client device mode communicator 210 transmits information to the Group Owner of the Wi-Fi Direct network. For example, the client device mode communicator 210 may transmit media device information to the Group Owner of the Wi-Fi Direct network.

In some examples, the client device mode communicator 210 transmits P2P administrator information (e.g., a Wi-Fi Direct data packet). For example, the client device mode communicator 210 may transmit a Group Owner negotiation packet, a Group Owner negotiation response packet, a Group Owner confirmation packet, etc. In another example, the Group Owner mode communicator 200 may transmit a beacon response to a Group Owner of a Wi-Fi Direct network.

In the illustrated example of FIG. 2, the streaming monitor 105 includes the P2P administrator 220 to administer and/or operate a Wi-Fi Direct network. In some examples, the P2P administrator 220 administers the Wi-Fi Direct network by forming or disbanding the Wi-Fi Direct network, configuring an operation mode of one or more devices to operate as a client device, adding additional client devices to the Wi-Fi Direct network etc. For example, the P2P administrator 220 may form the Wi-Fi Direct network where the streaming monitor 105 operates as the Group Owner. In another example, the P2P administrator 220 may join the Wi-Fi Direct network where the streaming monitor 105 operates as the client device. In some instances, the P2P administrator 220 operates the Wi-Fi Direct network by instructing the Group Owner mode communicator 200 to obtain and/or transmit media device information, media information, etc. In some examples, the P2P administrator 220 operates the Wi-Fi Direct network by instructing the client device mode communicator 210 to obtain and/or transmit media device information.

In the illustrated example of FIG. 2, the streaming monitor 105 includes the media presenter 230 to present media to a media presentation device. In some examples, the media presenter 230 presents the media to the media presentation device via a wireless connection. In some instances, the media presenter 230 presents the media received from a first client device to a second client device. For example, the media presenter 230 may obtain the media from the media device 115 of FIG. 1 and present the media to the media device 125 of FIG. 1. In some instances, the media presenter 230 receives media from more than one client device. For example, the media presenter 230 may receive a first media from the media device 115 and a second media from the media device 120. The media presenter 230 may determine which media to present. For example, the media presenter 230 may determine to present the second media to the media device 125. The media presenter 230 may determine which media to present based on a priority list stored in the streaming monitor 105, where the priority list is modifiable by a user (e.g., a panelist). For example, the user may modify a priority list for the Wi-Fi Direct network 185, where the user modifies the priority list to reflect that the media device 115 has priority over media device 120. In some instances, the media presenter 230 determines the media to present based on an order of received media. For example, the media presenter 230 may determine to stream the first media to the media device 125 because the media presenter 230 received the first media prior to the second media. The media presenter 230 may stream the second media when the streaming of the first media has been completed.

In the illustrated example of FIG. 2, the streaming monitor 105 includes the information processor 240 to process information obtained by the streaming monitor 105. In some examples, the information processor 240 extracts media device information from the obtained information. For example, the information processor 240 may extract device identification information, device manufacturer information, device type information, device operating system information, a device media access control (MAC) address, etc. from the obtained information. In some examples, the information processor 240 processes obtained media. The information processor 240 may process the obtained media by inspecting media metadata, inspecting a uniform resource locator (URL) associated with the media, etc. For example, the information processor 240 may extract media information such as quality information of the media, source identification of the media, a type identification of the media, and a bandwidth of the streaming media (e.g., a bandwidth of data transfer).

In the illustrated example of FIG. 2, the streaming monitor 105 includes the message generator 250 to generate a message based on information obtained by the streaming monitor 105. In some examples, the message generator 250 generates a message that includes a timestamp (e.g., a time at which a message is generated), media device information, media information, etc. The message generator 250 may generate the message periodically and/or a-periodically. For example, the message generator 250 may generate the message at a periodic interval (e.g., every 100 milliseconds). In another example, the message generator 250 may generate the message upon receipt of information. For example, the message generator 250 may generate the message when the streaming monitor 105 obtains media device information, media information, etc.

In the illustrated example of FIG. 2, the streaming monitor 105 includes the data store 260 to record data (e.g., obtained information, generated messages, etc.). The data store 260 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data store 260 may additionally or alternatively be implemented by one or more double data rate (DDR) memories, such as DDR, DDR2, DDR3, mobile DDR (mDDR), etc. The data store 260 may additionally or alternatively be implemented by one or more mass storage devices such as hard disk drive(s), compact disk drive(s) digital versatile disk drive(s), etc. While in the illustrated example the data store 260 is illustrated as a single database, the data store 260 may be implemented by any number and/or type(s) of databases. Furthermore, the data stored in the data store 660 may be in any data format such as, for example, binary data, comma delimited data, tab delimited data, structured query language (SQL) structures, etc.

In the illustrated example of FIG. 2, the streaming monitor 105 includes the network communicator 270 to transmit network communications data (e.g., generated messages) stored in the data store 260. The network communicator 270 of the illustrated example periodically and/or a-periodically transmits data from the data store 260 to the central facility 155 of FIG. 1. The network communicator 270 may transmit the data upon determining that the amount of data stored in the data store 260 has reached a threshold, and/or in response to a timer reaching a threshold (e.g., a time limit specifying that network communications are transmitted once every day). However, the transmission may occur at any desired interval(s) such as, for example, transmitting once every hour, once every week, etc. In examples in which the transmission is triggered based on an amount of data stored in the data store 260, the transmission threshold might indicate that data should be transmitted if there is more than a predetermined amount (e.g., one megabyte) of data stored in the data store 260. Any data storage amount may be used for such a trigger such as, for example, ten megabytes, one hundred megabytes, etc. Additionally or alternatively, multiple transmission thresholds may be present. For example, a threshold indicating that data should be transmitted at least once a day and a threshold indicating that network communications data should be transmitted if more than one megabyte of network communications data is stored in the data store 260 might be used.

In the illustrated example, the network communicator 270 transmits the data via the network 150 of FIG. 1. However, the network communicator 270 may transmit data via any other communication medium. For example, the streaming monitor 105 may be physically mailed to the central facility 155 and the network communicator 270 might transmit data via, for example, a USB connection, a Bluetooth connection, a serial connection, a local area network (LAN), etc.

While an example manner of implementing the example streaming monitor 105 of FIG. 1 is illustrated in FIG. 2, one or more of the elements, processes and/or devices illustrated in FIG. 2 may be combined, divided, re-arranged, omitted, eliminated and/or implemented in any other way. Further, the example Group Owner mode communicator 200, the example client device mode communicator 210, the example P2P administrator 220, the example media presenter 230, the example information extractor 240, the example message generator 250, the example data store 260, the example network communicator 270 and/or, more generally, the example streaming monitor 105 of FIGS. 1 and/or 2 may be implemented by hardware, software, firmware and/or any combination of hardware, software and/or firmware. Thus, for example, any of the example Group Owner mode communicator 200, the example client device mode communicator 210, the example P2P administrator 220, the example media presenter 230, the example information extractor 240, the example message generator 250, the example data store 260, the example network communicator 270 and/or, more generally, the example streaming monitor 105 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example Group Owner mode communicator 200, the example client device mode communicator 210, the example P2P administrator 220, the example media presenter 230, the example information extractor 240, the example message generator 250, the example data store 260, and/or the example network communicator 270 is/are hereby expressly defined to include a tangible computer readable storage device or storage disk such as a memory, a digital versatile disk (DVD), a compact disk (CD), a Blu-ray disk, etc. storing the software and/or firmware. Further still, the example streaming monitor 105 of FIGS. 1 and/or 2 may include one or more elements, processes and/or devices in addition to, or instead of, those illustrated in FIG. 2, and/or may include more than one of any or all of the illustrated elements, processes and devices.

Figure 3:
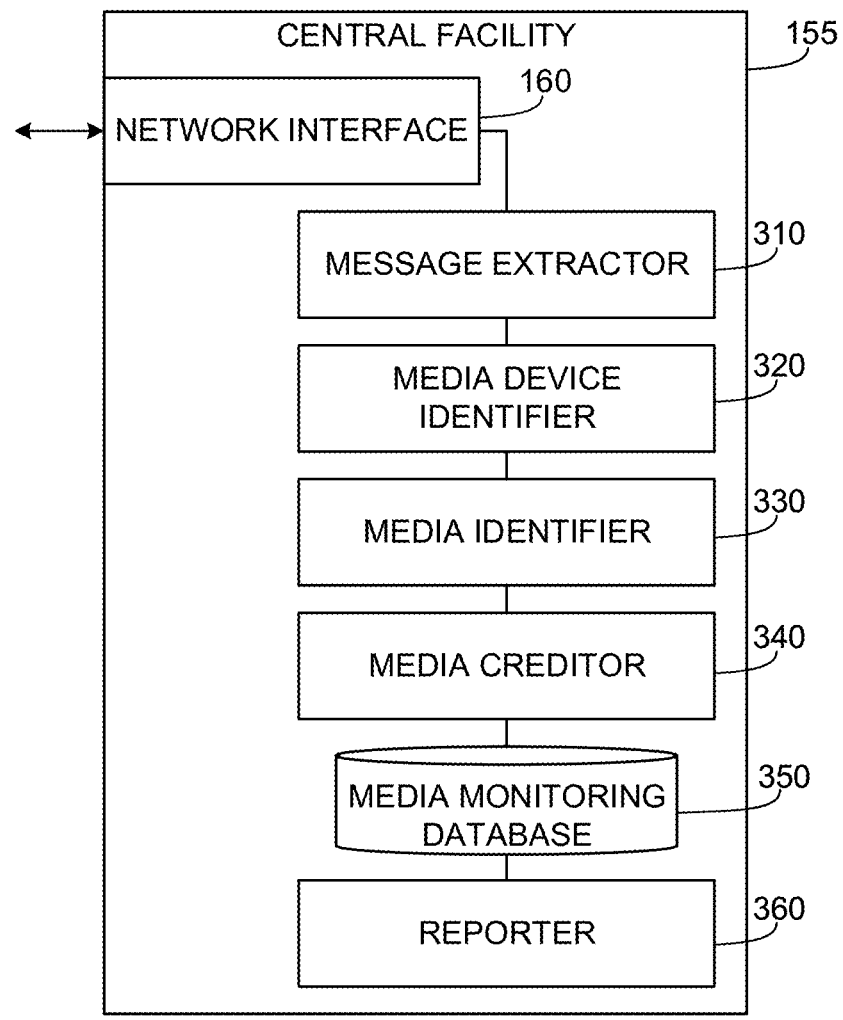
FIG. 3 is a block diagram of an example implementation of the central facility of FIG. 1.

FIG. 3 is a block diagram of an example implementation of the example central facility 155 of FIG. 1. The example central facility 155 of the illustrated example of FIG. 3 includes the example network interface 160, an example message extractor 310, an example media device identifier 320, an example media identifier 330, an example media creditor 340, an example media monitoring database 350, and an example reporter 360.

In the illustrated example of FIG. 3, the central facility 155 includes the network interface 160 to obtain information from and/or transmit information to the network 150 of FIG. 1. In the illustrated example, the example network interface 160 implements a web server that receives monitoring information from the example streaming monitor 105. In the illustrated example, the monitoring information is formatted as an HTTP message. However, any other message format and/or protocol may additionally or alternatively be used such as, for example, a file transfer protocol (FTP), a simple message transfer protocol (SMTP), an HTTP secure (HTTPS) protocol, etc.

In the illustrated example of FIG. 3, the central facility 155 includes the message extractor 310 to extract message information from the obtained network communication. In some examples, the message extractor 310 extracts media device information, media information, etc. from the message information. The message extractor 310 may extract individual messages from the message information. The message extractor 310 may also organize the extracted information into categories. For example, the message extractor 310 may assign device type information to a device type category. In another example, the message extractor 310 may assign the source identification of the media in a media source category.

In the illustrated example of FIG. 3, the central facility 155 includes the media device identifier 320 to identify a media device based on extracted message information. In some examples, the media device identifier 320 identifies the media device based on the media device information. For example, the media device identifier 320 may inspect the device identification information, the device manufacturer information, the device type information, the device operating system information, the device MAC address information, etc. However, any other technique for identifying the media device may additionally or alternatively be used.

In the illustrated example of FIG. 3, the central facility 155 includes the media identifier 330 to identify media from extracted message information. In some examples, the media identifier 330 identifies the media from the extracted message information based on the media information. For example, the media identifier 330 may inspect the extracted media information for media metadata, a uniform resource locator (URL) associated with the media, etc. However, any other technique for identifying the media may additionally or alternatively be used.

In the illustrated example of FIG. 3, the central facility 155 includes the media creditor 340 to credit media based on the obtained information. In some examples, the media creditor 340 credits the media based on the media device information. For example, the media creditor 340 may credit the media with device identification information (e.g., a device name, a device ID, etc.), device manufacturer information (e.g., Apple®, Google®, Samsung®, etc.), device type information (e.g., Apple® iPhone® 7, Google® Pixel, etc.), device operating system information (e.g., Apple® iOS, Google® Android®, etc.), and/or a device media access control (MAC) address. In some instances, the media creditor 340 credits the media with information corresponding to a streaming device and a media presentation device. For example, the media creditor 340 may credit the media with an iPhone streaming the media to a Samsung television.

In the illustrated example of FIG. 3, the central facility 155 includes the media monitoring database 350 to record data (e.g., media identification information, media crediting information, etc.). In the illustrated example, the example media monitoring database 350 stores media identification information (e.g., media metadata, a uniform resource locator, etc.) used to identify media. In some examples, the media monitoring database 350 additionally stores user identifying information and/or demographics such that received device identification information and/or media information can be translated into demographic information.

The media monitoring database 350 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The media monitoring database 350 may additionally or alternatively be implemented by one or more double data rate (DDR) memories, such as DDR, DDR2, DDR3, mobile DDR (mDDR), etc. The media monitoring database 350 may additionally or alternatively be implemented by one or more mass storage devices such as hard disk drive(s), compact disk drive(s) digital versatile disk drive(s), etc. While in the illustrated example media monitoring database 350 is illustrated as a single database, the media monitoring database 350 may be implemented by any number and/or type(s) of databases. Furthermore, the data stored in the media monitoring database 350 may be in any data format such as, for example, binary data, comma delimited data, tab delimited data, structured query language (SQL) structures, etc.

In the illustrated example of FIG. 3, the central facility 155 includes the media monitoring database 350 for storing data such as, for example, flash memory, magnetic media, optical media, etc. Furthermore, the data stored in the media monitoring database 730 may be in any data format such as, for example, binary data, comma delimited data, tab delimited data, structured query language (SQL) structures, etc. In the illustrated example, the example media monitoring database 730 stores metadata (e.g., codes, signatures, etc.) used to identify media. In some examples, the media monitoring database 730 additionally stores user identifying information and/or demographics such that received user identifiers can be translated into demographic information.

In the illustrated example of FIG. 3, the central facility 155 includes the reporter 360 to generate and/or prepare reports. The reporter 360 prepares media measurement reports indicative of the exposure of media on media devices. In some examples, the reporter 360 generates a report identifying demographics associated with the media via the received monitoring information. For example, a panelist at the media exposure measurement location 110 may have provided the panelist's demographics to the audience measurement entity. The reporter 360 may prepare a report associating the obtained panelist demographics with the exposed media. In some instances, the reporter 360 generates a report identifying demographics associated with the media devices via the received monitoring information. For example, the reporter 360 may prepare a report associating the obtained panelist demographics with the media device information. For example, the reporter 360 may associate the demographics of a panelist with a media device (e.g., an Apple® iPhone®) of the panelist.

While an example manner of implementing the example central facility 155 of FIG. 1 is illustrated in FIG. 3, one or more of the elements, processes and/or devices illustrated in FIG. 3 may be combined, divided, re-arranged, omitted, eliminated, and/or implemented in any other way. Further, the example network interface 160, the example message extractor 310, the example media device identifier 320, the example media identifier 330, the example media creditor 340, the example media monitoring database 350, the example reporter 360, and/or more generally, the example central facility 155 of FIGS. 1 and/or 3 may be implemented by hardware, software, firmware and/or any combination of hardware, software and/or firmware. Thus, for example, any of the example network interface 160, the example message extractor 310, the example media device identifier 320, the example media identifier 330, the example media creditor 340, the example media monitoring database 350, the example reporter 360, and/or more generally, the example central facility 155 of FIGS. 1 and/or 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 160, the example message extractor 310, the example media device identifier 320, the example media identifier 330, the example media creditor 340, the example media monitoring database 350, and/or the example reporter 360 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 155 of FIGS. 1 and/or 3 may include one or more elements, processes and/or devices in addition to, or instead of, those illustrated in FIG. 3, and/or may include more than one of any or all of the illustrated elements, processes, and devices.

Figure 4:
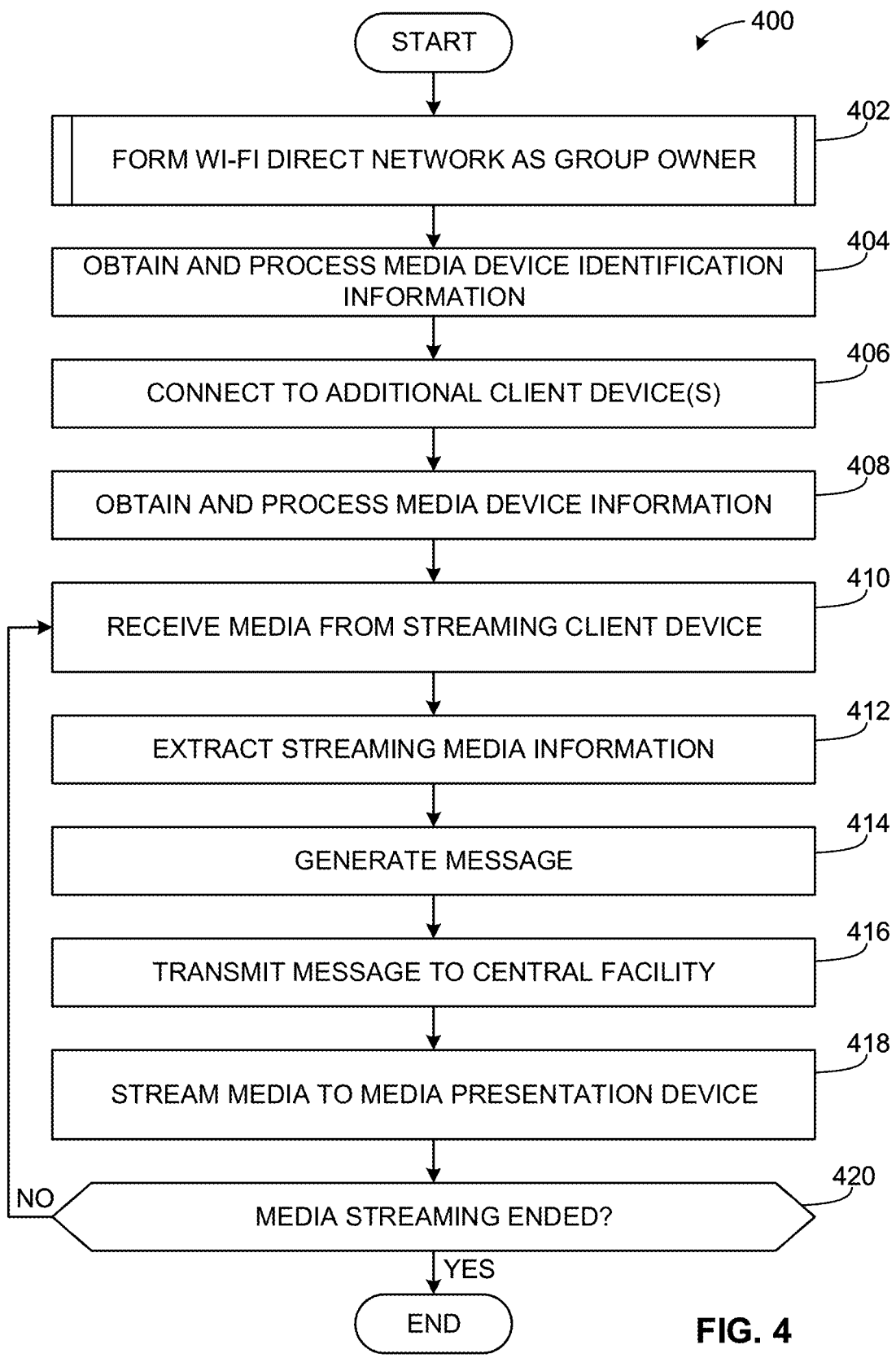
FIG. 4 is a flowchart representative of example machine-readable instructions that may be executed to implement the streaming monitor of FIGS. 1 and/or 2 to operate as a Group Owner of a Wi-Fi Direct network.
Figure 5:
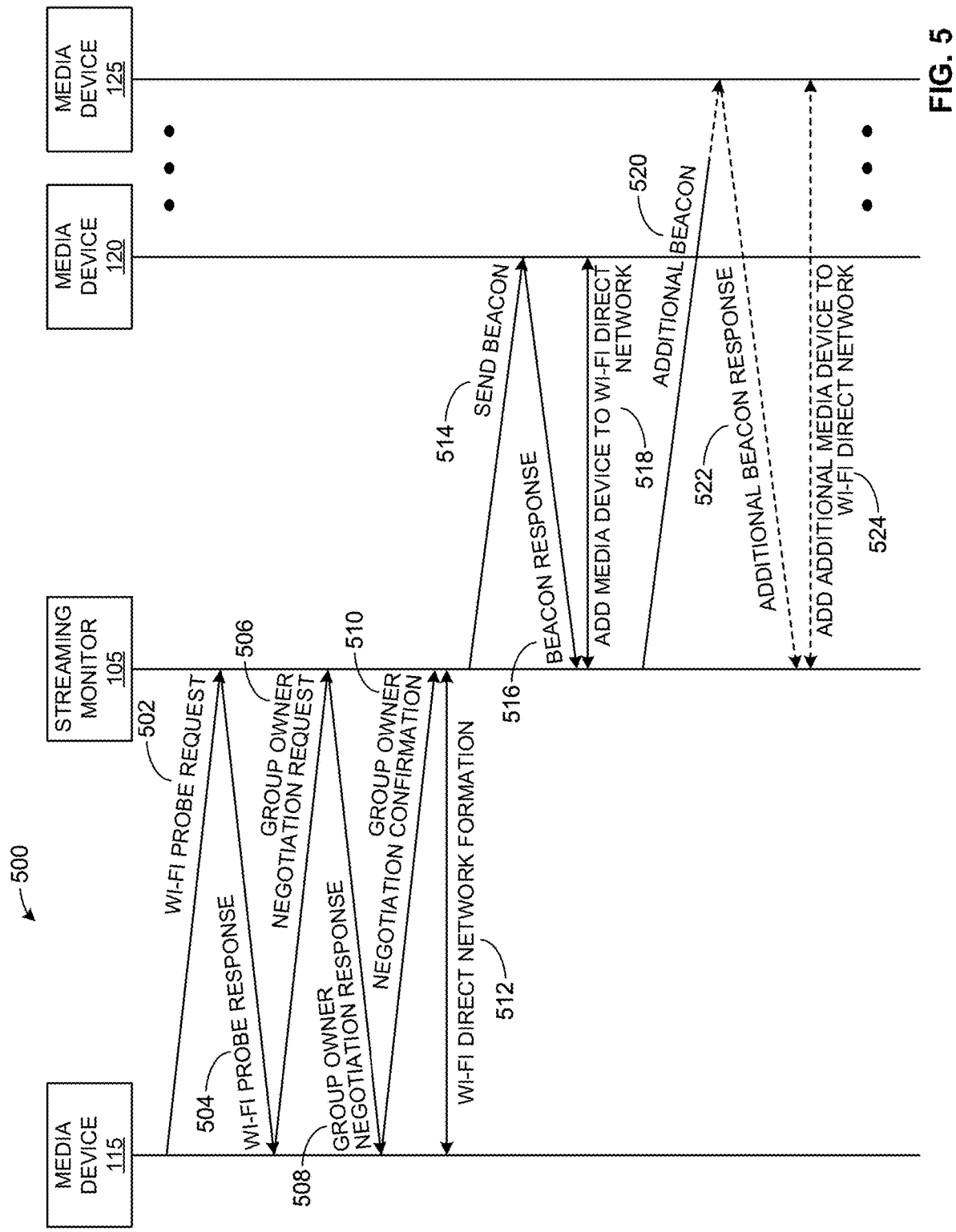
FIG. 5 illustrates an example data flow diagram illustrating a formation of a Wi-Fi Direct network between the streaming monitor and the client devices of FIGS. 1 and/or 2.
Figure 6:
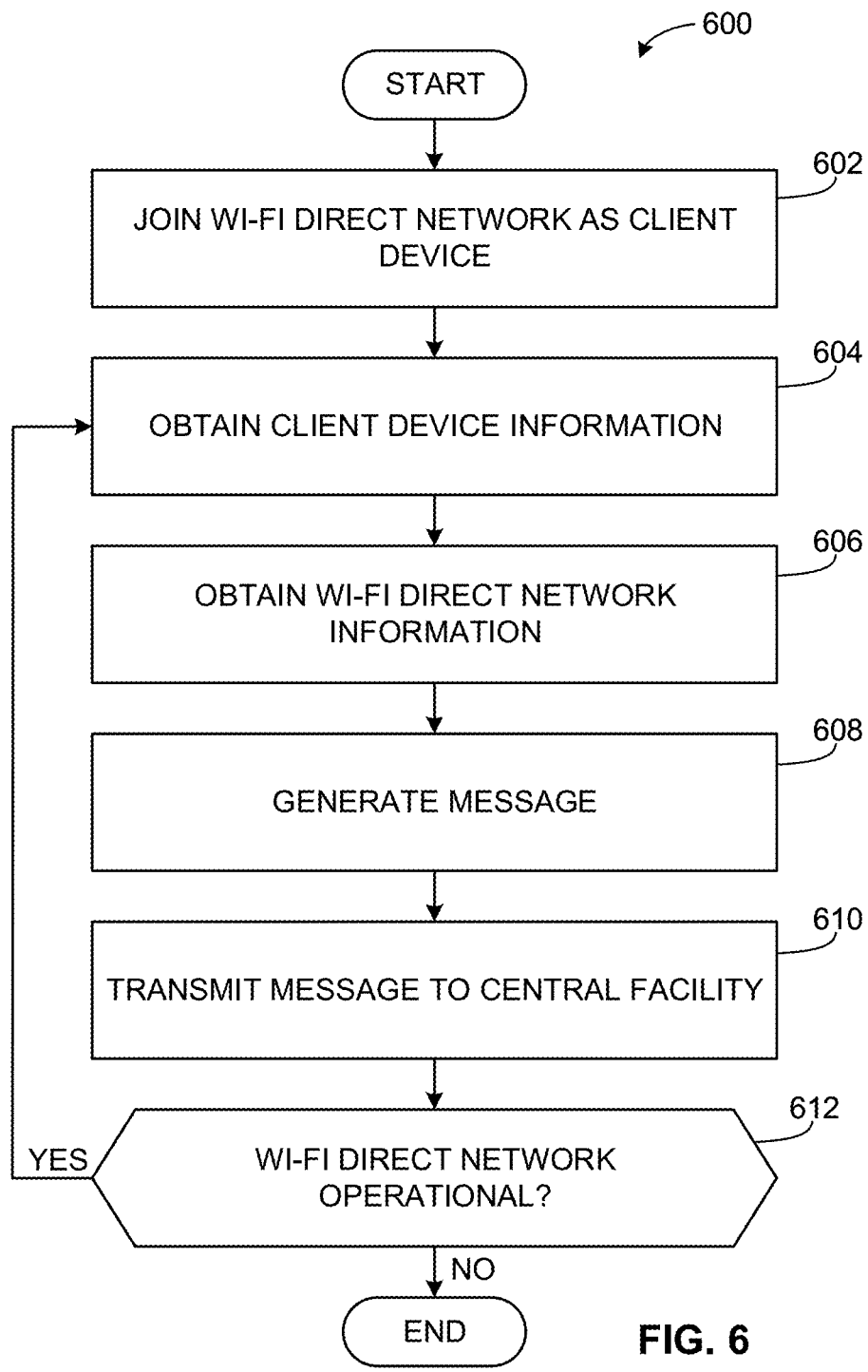
FIG. 6 is a flowchart representative of example machine-readable instructions that may be executed to implement the streaming monitor of FIGS. 1 and/or 2 to operate as a client device of a Wi-Fi direct network.

Flowcharts and data diagrams representative of example machine readable instructions for implementing the example streaming monitor 105 of FIGS. 1 and/or 2 are shown in FIGS. 4-6. In these examples, the machine-readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts and/or data diagram illustrated in FIGS. 4-6, many other methods of implementing the example streaming monitor 105 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 4 is a flowchart representative of example machine-readable instructions which may be executed to implement the streaming monitor 105 of FIGS. 1 and/or 2 to operate as a Group Owner of a Wi-Fi Direct network. The example program 400 of FIG. 4 begins at block 402 when a streaming monitor 105 forms a Wi-Fi Direct network as a Group Owner. For example, the P2P administrator 220 may cause the streaming monitor 105 to form a Wi-Fi Direct network with the media device 115 of FIG. 1, where the streaming monitor 105 operates as a Group Owner. At block 404, the streaming monitor 105 obtains and processes media device information. For example, the Group Owner mode communicator 200 may obtain the media device identification from a media device. The information processor 240 may process the media device identification from the media device. At block 406, the streaming monitor 105 connects to additional client devices. For example, the P2P administrator 220 may connect to the media devices 120, 125 of FIG. 1. At block 408, the streaming monitor 105 obtains and processes media device information. For example, the Group Owner mode communicator 200 may obtain the media device identification information from the media devices 120, 125. The information processor 240 may process the media device identification from the media devices 120, 125.

At block 410, the streaming monitor 105 receives media from a streaming client device. For example, the Group Owner mode communicator 200 may obtain media from the media device 115. At block 412, the streaming monitor 105 extracts media information from the processed media. For example, the information processor 240 may extract media information such as media identification information from the processed media. At block 414, the streaming monitor 105 generates a message. For example, the message generator 250 may generate a message based on at least the device identification information and/or the media information. At block 416, the streaming monitor 105 transmits the message to the central facility. For example, the network communicator 270 may transmit the message to the central facility 155. At block 418, the streaming monitor 105 streams the media to a media presentation device. For example, the media presenter 230 may stream the media to the media device 125 via the Group Owner mode communicator 200. At block 420, the streaming monitor 105 determines whether the media streaming ended. For example, the media presenter 230 may determine that the media device 115 is no longer streaming media to the media presenter 230. If, at block 420, the streaming monitor 105 determines that the media streaming did not end, control returns to block 410 to continue receiving the media from the streaming client device, otherwise the example program 400 concludes.

FIG. 5 is a data flow diagram 500 representative of example messages sent by the example streaming monitor 105 and/or the media devices 115, 120, 125 to form the Wi-Fi Direct network 185 of FIG. 1. The data flow diagram 500 begins when the example media device 115 broadcasts an example Wi-Fi probe request 502. Alternatively, the example streaming monitor 105 may broadcast the example Wi-Fi probe request 502. The example Wi-Fi probe request 502 may be broadcast utilizing a Wi-Fi radio of the streaming monitor 105 and/or the media device 115 to communicate with additional devices within range of the Wi-Fi radio. When the example streaming monitor 105 receives the example Wi-Fi probe request 502 from the example media device 115, the streaming monitor 105 transmits an example Wi-Fi probe response 504 to the media device 115. When the example media device 115 receives the example Wi-Fi probe response 504, the example media device 115 transmits an example Group Owner negotiation request 506 to the example streaming monitor 105. The example Group Owner negotiation request 506 includes a Group Owner intent attribute value. For example, the Group Owner negotiation request 506 may include a Group Owner intent attribute value of 5 for the media device 115. In response to the example streaming monitor 105 receiving the example Group Owner negotiation request 506, the streaming monitor 105 transmits an example Group Owner negotiation response 508 to the example media device 115. The example Group Owner negotiation response 508 includes a Group Owner intent attribute value for the example streaming monitor 105. For example, the Group Owner negotiation response 508 may include a Group Owner intent attribute value of 10 for the streaming monitor 105.

If the value for the Group Owner intent attribute for the example streaming monitor 105 is a greater value than the value for the Group Owner intent attribute for the example media device 115, then the streaming monitor 105 determines that the streaming monitor 105 is the Group Owner for the example Wi-Fi Direct network 185. For example, the streaming monitor 105 may determine that the streaming monitor 105 is the Group Owner of the Wi-Fi Direct network 185 based on having the value of 10 for the Group Owner intent attribute, which is a greater value than the value of 5 for the Group Owner intent attribute for the media device 115. Alternatively, if the value for the Group Owner intent attribute for the example streaming monitor 105 is a lesser value than the value for the Group Owner intent attribute for the example media device 115, then the streaming monitor 105 determines that the media device 115 is the Group Owner for the example Wi-Fi Direct network 185. If the values for the Group Owner intent attribute for the example streaming monitor 105 and the example media device 115 are the same, then the streaming monitor 105 determines whether the streaming monitor 105 is the Group Owner of the example Wi-Fi Direct network 185 based on a tie-breaker. The tie-breaker is based on a comparison of a value for a tie-breaker Group Owner intent attribute included in the example Group Owner negotiation request 506 and a value for a tie-breaker Group Owner intent attribute included in the example Group owner negotiation response 508. For example, when the values for the Group Owner intent attribute for the streaming monitor 105 and the media device 115 are the same, the streaming monitor 105 may determine that the streaming monitor 105 is the Group Owner for the Wi-Fi Direct network 185 when the value for the tie-breaker Group Owner intent attribute in the streaming monitor 105 and/or included in the Group Owner negotiation response 508 is a greater value than the value for the tie-breaker Group Owner intent attribute included in the media device 115 and/or included in the Group Owner negotiation request 506. In some examples, the value for the tie-breaker Group Owner intent attribute for the media device 115 is randomly generated upon creation of the Group Owner negotiation request 506 by the media device 115. In some instances, the value for the tie-breaker Group Owner intent attribute for the streaming monitor 105 is randomly generated upon creation of the Group Owner negotiation response 508 by the streaming monitor 105.

When the example media device 115 receives the example Group Owner negotiation response 508, the media device 115 transmits an example Group Owner negotiation confirmation 510 to the example streaming monitor 105. The example Group Owner negotiation confirmation 510 may include a confirmation that the example media device 115 confirms to operate as a client device of the example Wi-Fi Direct network 185. In response to the example streaming monitor 105 receiving the example Group Owner negotiation confirmation 510, the streaming monitor 105 and the example media device 115 exchange one or more example Wi-Fi Direct network formation 512 messages. For example, the streaming monitor 105 may exchange one or more heartbeat data packets with the media device 115 to form the Wi-Fi Direct network 185 with the media device 115.

In the illustrated example of FIG. 5, when the streaming monitor 105 determines that the streaming monitor 105 is the Group Owner of the Wi-Fi Direct network 185, the streaming monitor 105 broadcasts beacon 514 within range of the Wi-Fi Direct network 185. The example streaming monitor 105 may broadcast the example beacon 514 to determine whether there are additional client devices within the range of the example Wi-Fi Direct network 185. In the illustrated example, the media device 120 receives the beacon 514. In response to receiving the example beacon 514, the example media device 120 sends an example beacon response 516 to the example streaming monitor 105. When the example streaming monitor 105 receives the example beacon response 516, the streaming monitor 105 and the example media device 120 exchange one or more add media device to Wi-Fi Direct network 518 messages. For example, the streaming monitor 105 may exchange one or more heartbeat data packets with the media device 120 to add the media device 120 to the Wi-Fi Direct network 185.

In response to adding the example media device 120 to the example Wi-Fi Direct network 185, the example streaming monitor 105 broadcasts an example additional beacon 520 within the range of the Wi-Fi Direct network 185. The example streaming monitor 105 may broadcast the additional beacon 520 to determine whether there are additional client devices within the range of the example Wi-Fi Direct network 185. Subsequent client devices such as the example media device 125 may be added to the example Wi-Fi Direct network 185 in a similar manner as described above, which may include an example additional beacon response 522 and an add additional media device to Wi-Fi Direct network 524 message.

Figure 8:
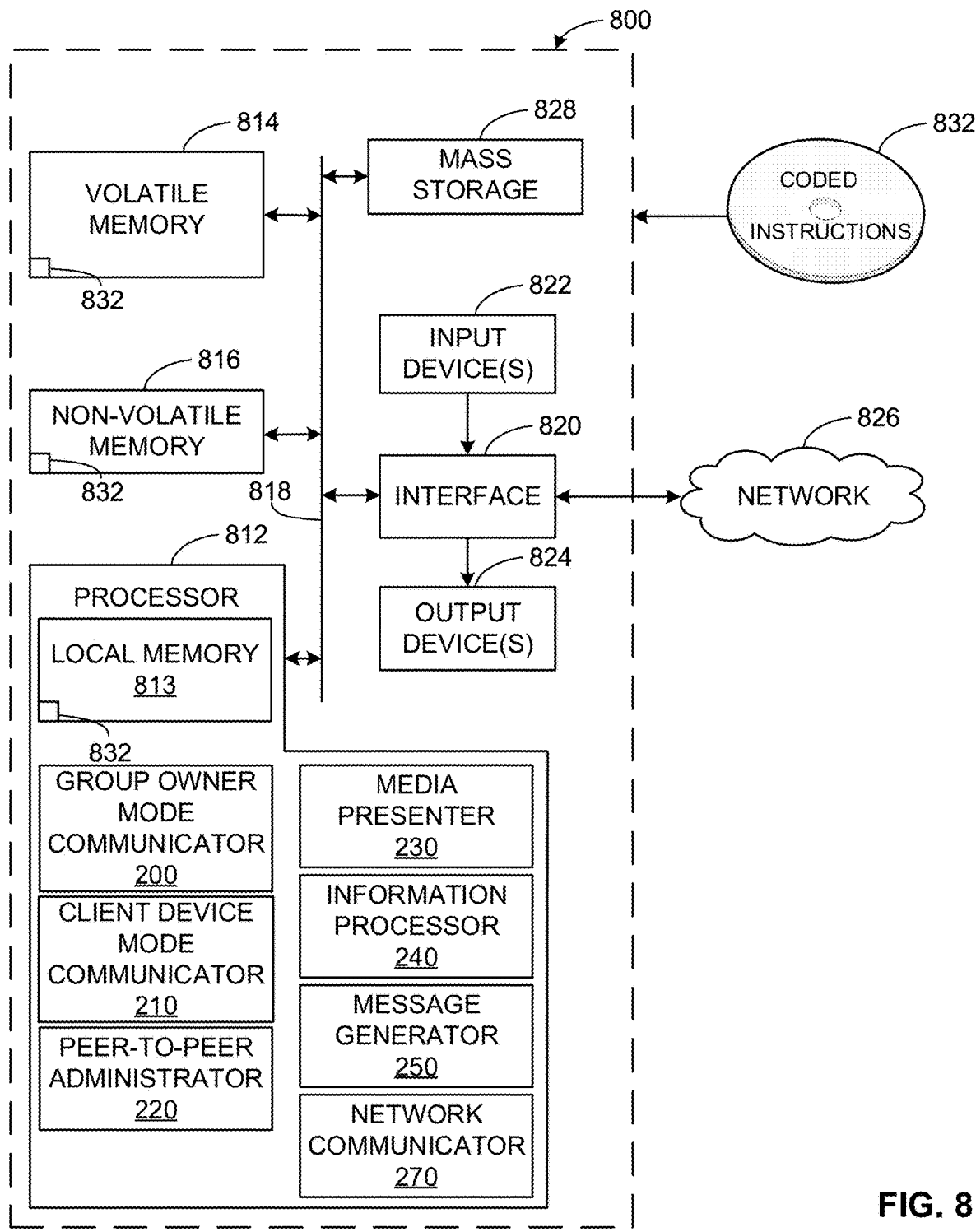
FIG. 8 is a block diagram of an example processing platform structured to execute the example machine-readable instructions of FIGS. 4-6 to implement the streaming monitor of FIGS. 1 and/or 2.

FIG. 6 is a flowchart representative of example machine-readable instructions which may be executed by the processor 812 of FIG. 8 to implement the streaming monitor 105 of FIGS. 1 and/or 2 to operate as a client device of a Wi-Fi Direct network. The example program 600 of FIG. 6 begins at block 602 when the streaming monitor 105 joins a Wi-Fi Direct network as a client device. For example, the P2P administrator 220 may cause the streaming monitor 105 to join the Wi-Fi Direct network 190 as a client device, where the media device 130 is the Group Owner of the Wi-Fi Direct network 190. At block 604, the streaming monitor 105 obtains client device information. For example, the client device mode communicator may obtain media device information from the Group Owner of the Wi-Fi Direct network 190, where the Group Owner is the media device 130. The media device information may include media device information for the media devices 130, 135, 140. The information processor 240 may extract media device information from the client device information such as device identification information, device manufacturer information, etc. of the media devices 130, 135, 140.

At block 606, the streaming monitor 105 obtains Wi-Fi Direct network information. For example, the client device mode communicator 210 may obtain Wi-Fi Direct network information from the Group Owner of the Wi-Fi Direct network 190, where the Group Owner is the media device 130. The information processor 240 may extract media information from the Wi-Fi Direct network information such as a bandwidth or a data rate of one or more streaming activities (e.g., a streaming data rate between the media device 130 and the media device 140).

At block 608, the streaming monitor generates a message. For example, the message generator 250 may generate a message that includes the extracted media device information, the media information, etc. At block 610, the streaming monitor 105 transmits the message to a central facility. For example, the network communicator 270 may transmit the message to the central facility 155. At block 612, the streaming monitor 105 determines whether the Wi-Fi Direct network is operational. For example, the P2P administrator 220 may determine whether the Wi-Fi Direct network 190 is functional and/or operational. If, at block 612, the streaming monitor 105 determines that the Wi-Fi Direct network is operational, control returns to block 604 to obtain additional Wi-Fi Direct network information, otherwise the example program 600 concludes.

Figure 7:
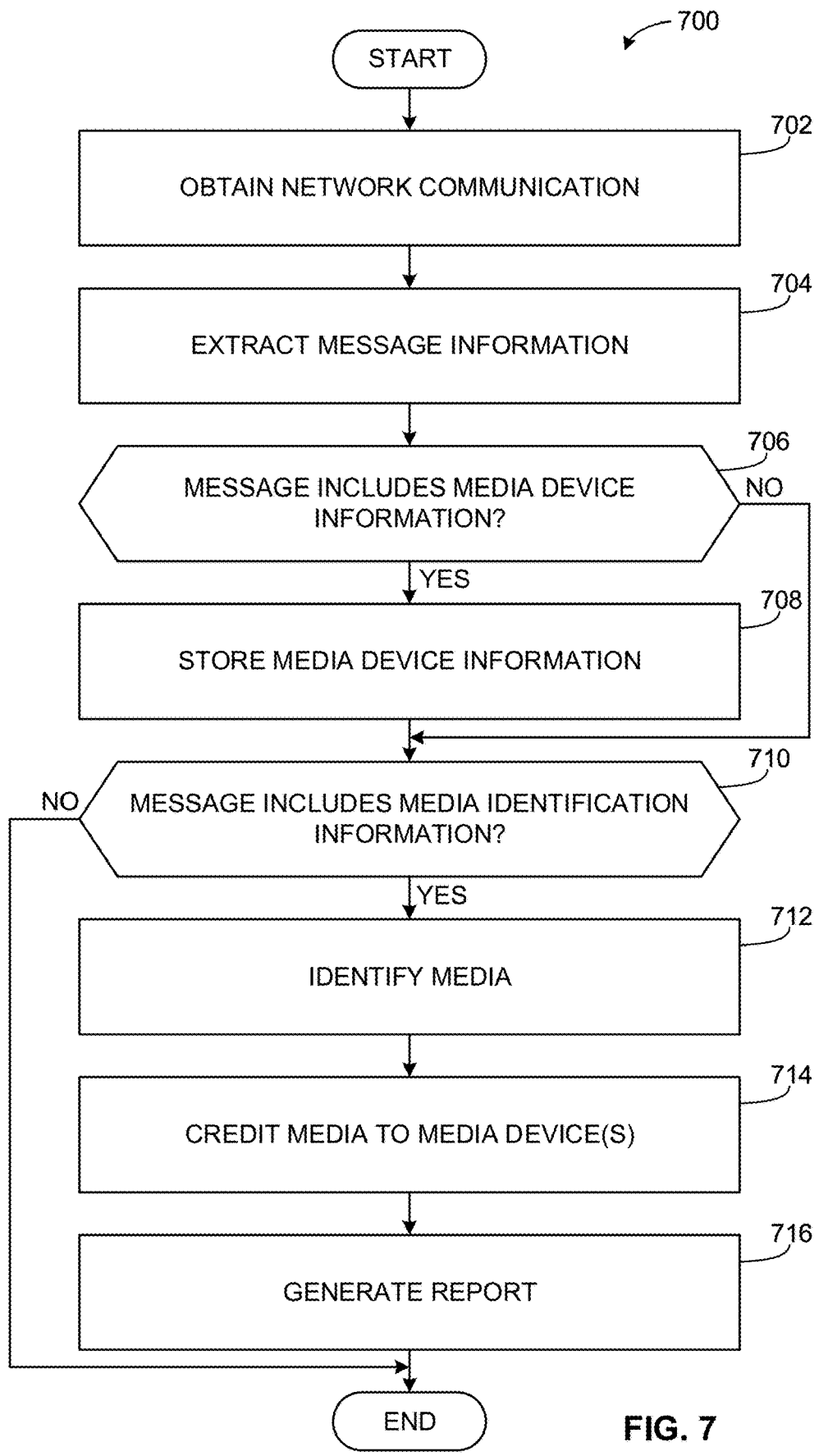
FIG. 7 is a flowchart representative of example machine-readable instructions that may be executed to implement the central facility of FIGS. 1 and/or 3.

A flowchart representative of example machine readable instructions for implementing the example central facility 155 of FIGS. 1 and/or 3 are shown in FIG. 7. In this example, the machine-readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 7, many other methods of implementing the example central facility 155 may alternatively be used. For example, the order of execution of the blocks may be changed, and/or some of the blocks described may be changed, eliminated, or combined.

As mentioned above, the example process of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 9:
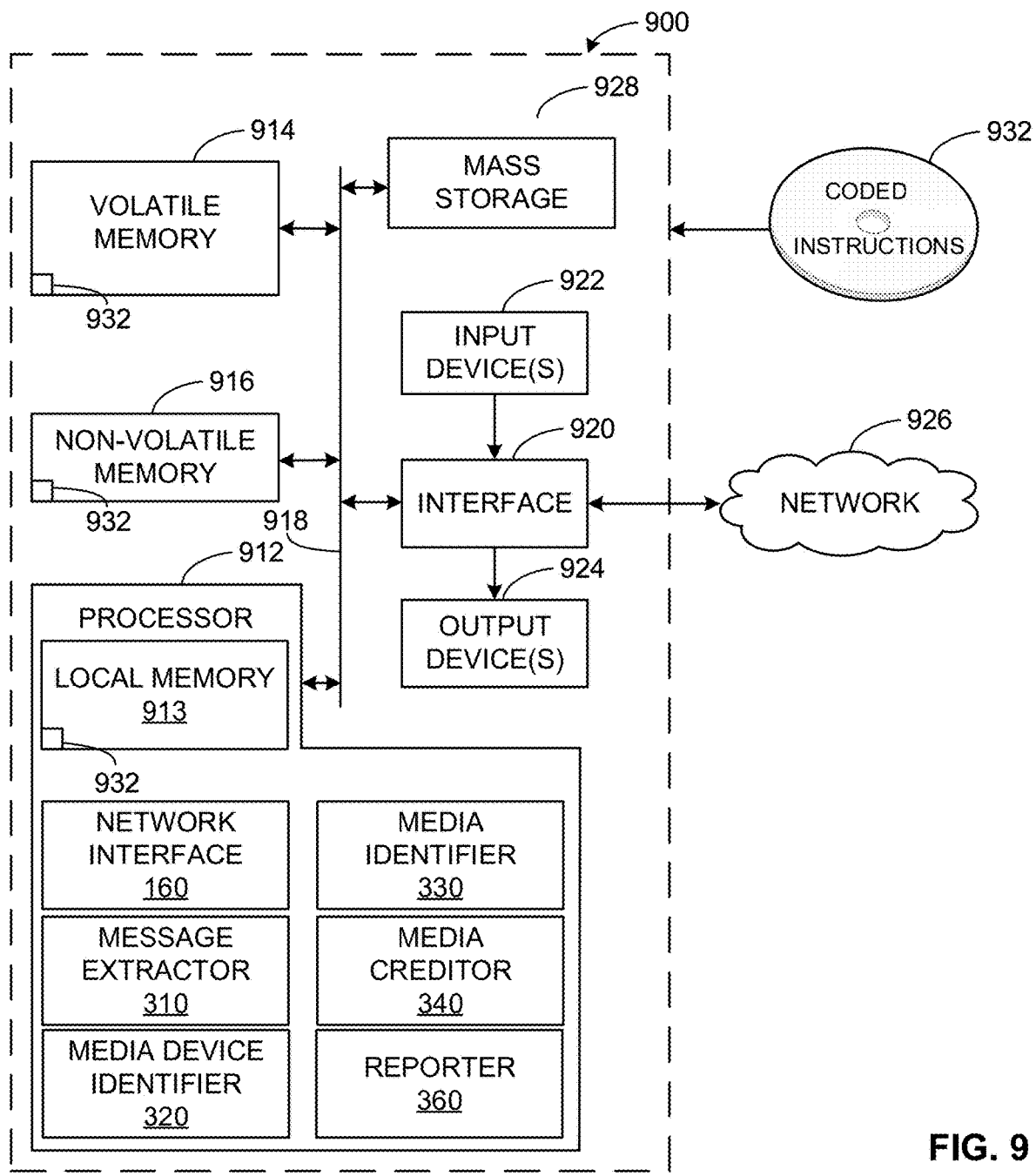
FIG. 9 is a block diagram of an example processing platform structured to execute the example machine-readable instructions of FIG. 7 to implement the central facility of FIGS. 1 and/or 3.

FIG. 7 is a flowchart representative of example machine-readable instructions which may be executed by the processor 912 of FIG. 9 to implement the central facility 155 of FIGS. 1 and/or 3 to credit media. The example program 700 of FIG. 7 begins at block 702 when the central facility 155 obtains a network communication. For example, the network interface 160 may obtain a network communication via the network 150. At block 704, the central facility 155 extracts message information. For example, the message extractor 310 may extract a message from the network communication. At block 706, the central facility 155 determines whether the message includes media device information. For example, the media device identifier 320 may determine whether the message includes media device information. If, at block 706, the central facility 155 determines that the message does not include media device information, control proceeds to block 710 to determine whether the message includes media identification information. If, at block 706, the central facility 155 determines that the message does include media device information, then, at block 708, the central facility 155 stores the media device information. For example, the media device identifier 320 may store the media device information in the media monitoring database 350.

At block 710, the central facility 155 determines whether the message includes media identification information. For example, the media identifier 330 may determine whether the message includes media identification information. If, at block 710, the central facility 155 determines that the message does not include media identification information then the example program 700 concludes. If, at block 710, the central facility 155 determines that the message includes media identification information, then, at block 712, the central facility 155 identifies the media. For example, the media identifier 330 may identify the media. The media identifier 330 may identify the media by inspecting media metadata, a uniform resource locator (URL) associated with the media, etc.

At block 714, the central facility 155 credits the media to one or more media devices. For example, the media creditor 340 may credit the media to the media devices 115, 120, 125, 130, 135, 140 of FIG. 1. For example, the media creditor 340 may credit the media as having been streamed by the media device 115 and/or presented by the media device 125. In another example, the media creditor 340 may credit the media to corresponding media device information of the media devices 115, 120, 125, 130, 135, 140. For example, the media creditor 340 may credit the media as having been streamed by an Apple® iPhone® to a Samsung® smart television. At block 716, the central facility 155 generates a report. For example, the reporter 360 may generate a report based on the crediting of the media to the media device information, the media identification information, etc.

FIG. 8 is a block diagram of an example processor platform 800 capable of executing the instructions and/or the data diagram of FIGS. 4-6 to implement the example streaming monitor 105 of FIGS. 1 and/or 2. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example executes the instructions to implement the example streaming monitor 105 of FIGS. 1 and/or 2. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The example mass storage 828 implements the example data store 260.

The coded instructions 832 of FIGS. 4-6 may be stored in the mass storage device 828, in the volatile memory 814, in the non-volatile memory 816, and/or on a removable tangible computer readable storage medium such as a CD or DVD.

FIG. 9 is a block diagram of an example processor platform 900 capable of executing the instructions of FIG. 7 to implement the example central facility 155 of FIGS. 1 and/or 3. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example executes the instructions to implement the example central facility 155 of FIGS. 1 and/or 3. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The example mass storage 928 implements the example media monitoring database 350.

The coded instructions 932 of FIG. 7 may be stored in the mass storage device 928, in the volatile memory 914, in the non-volatile memory 916, and/or on a removable tangible computer readable storage medium such as a CD or DVD.

From the foregoing, it will appreciate that the above disclosed methods, apparatus, and articles of manufacture enable monitoring of media (e.g., streaming media) of a Wi-Fi Direct network.

As disclosed herein, example methods, apparatus, and articles of manufacture may be used to credit presentation of media to a media device based on obtained media device information and/or media information. Crediting the media device using the media device information and/or the media information enables more accurate identification of the presented media and more accurate identification of the media devices used to stream the media or, present the media. Moreover, such crediting improves processing capabilities for existing crediting systems. For example, whereas a media device may not be credited for the presented media, in examples disclosed herein, the media device may be credited for the presented media using the improved crediting capabilities. The improved crediting capabilities include crediting the media device with streaming activities beyond an initial accessing (e.g., downloading) of the media. Accurately crediting the media device using the enhanced crediting capabilities may result in fewer hardware components to implement the crediting system, thus resulting in reduced system complexity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
message extractor circuitry to:
extract first message information from a first message and second message information from a second message, the first message and the second message obtained from a streaming monitor, the streaming monitor to operate as a Group Owner of a first direct media network while connected to a second direct media network as a client device;
determine that the first message information includes media identification information of first media presented in the first direct media network and media device information associated with at least one of a first streaming client device associated with the first direct media network or a first media presentation device associated with the first direct media network;
determine that the streaming monitor generated the first message in response to the streaming monitor transmitting the first media to the first media presentation device after the streaming monitor extracts at least one of the media identification information or the media device information from the first media; and
determine that the streaming monitor generated the second message in response to a second streaming client device transmitting second media to a second media presentation device in the second direct media network;
media device identifier circuitry to identify at least one of the first streaming client device or the first media presentation device based on the media device information;
media identifier circuitry to identify the first media based on the media identification information;
media creditor circuitry to credit the first media as having been accessed in response to an identification of the first media; and
reporter circuitry to generate a media measurement report indicative of exposure of the first media to a plurality of devices including the first streaming client device and the first media presentation device.

2. The apparatus of claim 1, wherein the message extractor circuitry is to extract at least one of device identification information, device manufacturer information, device operating system information, device type information, or a device media access control (MAC) address from the media device information.

3. The apparatus of claim 1, wherein the message extractor circuitry is to extract at least one of media metadata or a uniform resource locator from the media identification information.

4. The apparatus of claim 1, wherein the message extractor circuitry is to extract a bandwidth of data transfer from the first message information, the data transfer to be between the first streaming client device and the first media presentation device via the streaming monitor.

5. The apparatus of claim 1, wherein the media creditor circuitry is to credit the first media with at least one of device identification information, device manufacturer information, device operating system information, device type information, or a device media access control (MAC) address.

6. The apparatus of claim 1, wherein the message extractor circuitry is to assign a first portion of the media identification information in a media source category and a second portion of the media device information in a device type category, and further including a database to store the media source category and the device type category.

7. The apparatus of claim 1, wherein the media measurement report includes demographics of panelists associated with at least one of the first streaming client device or the first media presentation device.

8. A non-transitory computer readable storage medium comprising instructions that, when executed, cause at least one processor to at least:
  extract first message information from a first message and second message information from a second message, the first message and the second message obtained from a streaming monitor, the streaming monitor to operate as a Group Owner of a first direct media network while connected to a second direct media network as a client device;
  determine that the first message information includes media identification information of first media presented in the first direct media network and media device information associated with at least one of a first streaming client device associated with the first direct media network or a first media presentation device associated with the first direct media network;
  determine that the streaming monitor generated the first message in response to the streaming monitor transmitting the first media to the first media presentation device after the streaming monitor extracts at least one of the media identification information or the media device information from the first media;
  determine that the streaming monitor generated the second message in response to a second streaming client device transmitting second media to a second media presentation device in the second direct media network;
  identify at least one of the first streaming client device or the first media presentation device based on the media device information;
  identify the first media based on the media identification information;
  credit the first media as having been accessed in response to an identification of the first media; and
  generate a media measurement report indicative of exposure of the first media to a plurality of devices including the first streaming client device and the first media presentation device.

9. The non-transitory computer readable storage medium of claim 8, wherein the instructions, when executed, cause the at least one processor to extract at least one of device identification information, device manufacturer information, device operating system information, device type information, or a device media access control (MAC) address from the media device information.

10. The non-transitory computer readable storage medium of claim 8, wherein the instructions, when executed, cause the at least one processor to extract at least one of media metadata or a uniform resource locator from the media identification information.

11. The non-transitory computer readable storage medium of claim 8, wherein the instructions, when executed, cause the at least one processor to extract a bandwidth of data transfer from the first message information, the data transfer to be between the first streaming client device and the first media presentation device via the streaming monitor.

12. The non-transitory computer readable storage medium of claim 8, wherein the instructions, when executed, cause the at least one processor to credit the first media with at least one of device identification information, device manufacturer information, device operating system information, device type information, or a device media access control (MAC) address.

13. A method comprising:
  extracting, by executing an instruction with a processor, first message information from a first message and second message information from a second message, the first message and the second message obtained from a streaming monitor, the streaming monitor operating as a Group Owner of a first direct media network while connected to a second direct media network as a client device;
  determining, by executing an instruction with the processor, that the first message information includes media identification information of first media presented in the first direct media network and media device information associated with at least one of a first streaming client device associated with the first direct media network or a first media presentation device associated with the first direct media network;
  determining, by executing an instruction with the processor, that the streaming monitor generated the first message in response to the streaming monitor transmitting the first media to the first media presentation device after the streaming monitor extracts at least one of the media identification information or the media device information from the first media;
  identifying, by executing an instruction with the processor, at least one of the first streaming client device or the first media presentation device based on the media device information;
  determining, by executing an instruction with the processor, that the streaming monitor generated the second message in response to a second streaming client device transmitting second media to a second media presentation device in the second direct media network;
  identifying, by executing an instruction with the processor, the first media based on the media identification information;
  crediting, by executing an instruction with the processor, the first media as having been accessed in response to identifying the first media; and
  generating a media measurement report indicative of exposure of the first media to a plurality of devices including the first streaming client device and the first media presentation device.

14. The method of claim 13, further including extracting at least one of device identification information, device manufacturer information, device operating system information, device type information, or a device media access control (MAC) address from the media device information.

15. The method of claim 13, further including extracting at least one of media metadata or a uniform resource locator from the media identification information.

16. The method of claim 13, further including extracting a bandwidth of data transfer from the first message information, the data transfer to be between the first streaming client device and the first media presentation device via the streaming monitor.

17. The method of claim 13, further including crediting the first media with at least one of device identification information, device manufacturer information, device operating system information, device type information, or a device media access control (MAC) address.

18. The method of claim 13, further including:
  establishing, with the streaming monitor, the first direct media network by performing a negotiation process with the first streaming client device.

19. The apparatus of claim 1, wherein the media identification information is first media identification information, and wherein:
  the message extractor circuitry to:
    extract second media identification information from the second message information; and determine that the second media identification information is associated with at least one of the second streaming client device or the second media presentation device; and the media device identifier circuitry to identify the at least one of the second streaming client device or the second media presentation device based on the media device information, the media measurement report to be indicative of exposure of the second media to the at least one of the second streaming client device or the second media presentation device.

20. The non-transitory computer readable storage medium of claim 8, wherein the media identification information is first media identification information, and the instructions, when executed, cause the at least one processor to:

extract second media identification information from the second message information;

determine that the second media identification information is associated with at least one of the second streaming client device or the second media presentation device; and identify the at least one of the second streaming client device or the second media presentation device based on the media device information, the media measurement report to be indicative of exposure of the second media to the at least one of the second streaming client device or the second media presentation device.

21. The method of claim 13, wherein the media identification information is first media identification information, and further including:

extracting second media identification information from the second message information;

determining that the second media identification information is associated with at least one of the second streaming client device or the second media presentation device; and identifying the at least one of the second streaming client device or the second media presentation device based on the media device information, the media measurement report to be indicative of exposure of the second media to the at least one of the second streaming client device or the second media presentation device.

22. An apparatus comprising:
memory;
instructions; and
processor circuitry to execute the instructions to at least:
extract first message information from a first message and second message information from a second message, the first message and the second message obtained from a streaming monitor, the streaming monitor to operate as a Group Owner of a first direct media network while connected to a second direct media network as a client device;

determine that the first message information includes media identification information of first media presented in the first direct media network and media device information associated with at least one of a first streaming client device associated with the first direct media network or a first media presentation device associated with the first direct media network;

determine that the streaming monitor generated the first message in response to the streaming monitor transmitting the first media to the first media presentation device after the streaming monitor extracts at least one of the media identification information or the media device information from the first media;

determine that the streaming monitor generated the second message in response to a second streaming client device transmitting second media to a second media presentation device in the second direct media network;

identify at least one of the first streaming client device or the first media presentation device based on the media device information;

identify the first media based on the media identification information;

credit the first media as having been accessed in response to an identification of the first media; and generate a media measurement report indicative of exposure of the first media to a plurality of devices including the first streaming client device and the first media presentation device.

23. The apparatus of claim 22, wherein the processor circuitry is to extract at least one of device identification information, device manufacturer information, device operating system information, device type information, or a device media access control (MAC) address from the media device information.

24. The apparatus of claim 22, wherein the processor circuitry is to extract at least one of media metadata or a uniform resource locator from the media identification information.

25. The apparatus of claim 22, wherein the processor circuitry is to extract a bandwidth of data transfer from the first message information, the data transfer to be between the first streaming client device and the first media presentation device via the streaming monitor.

26. The apparatus of claim 22, wherein the processor circuitry is to credit the first media with at least one of device identification information, device manufacturer information, device operating system information, device type information, or a device media access control (MAC) address.

27. The apparatus of claim 22, wherein the processor circuitry is to:
assign a first portion of the media identification information in a media source category and a second portion of the media device information in a device type category; and
store the media source category and the device type category.

28. The apparatus of claim 22, wherein the processor circuitry is to generate the media measurement report to include demographics of panelists associated with at least one of the first streaming client device or the first media presentation device.

29. The apparatus of claim 22, wherein the media identification information is first media identification information, and the processor circuitry is to:
extract second media identification information from the second message information;
determine that the second media identification information is associated with at least one of the second streaming client device or the second media presentation device; and
identify the at least one of the second streaming client device or the second media presentation device based on the media device information, the media measurement report to be indicative of exposure of the second media to the at least one of the second streaming client device or the second media presentation device.

* * * * *